(12) United States Patent
Koreeda et al.

(10) Patent No.: US 6,822,800 B2
(45) Date of Patent: Nov. 23, 2004

(54) OBJECTIVE LENS FOR OPTICAL PICKUP

(75) Inventors: Daisuke Koreeda, Saitama-ken (JP); Koichi Maruyama, Tokyo (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 10/456,674

(22) Filed: Jun. 9, 2003

(65) Prior Publication Data

US 2003/0231407 A1 Dec. 18, 2003

(30) Foreign Application Priority Data

Jun. 10, 2002 (JP) ........................................ 2002-168569

(51) Int. Cl.[7] .............................................. G02B 27/00
(52) U.S. Cl. ...................... 359/634; 359/637; 359/719; 369/112.08
(58) Field of Search .............................. 359/618, 634, 359/637, 718, 719, 722, 721; 369/112.01, 112.03, 112.05–112.08, 112.11–112.13

(56) References Cited

U.S. PATENT DOCUMENTS

| 6,043,912 | A | 3/2000 | Yoo et al. ...................... 359/19 |
| 6,088,322 | A | 7/2000 | Broome et al. .......... 369/112.26 |
| 6,118,594 | A | 9/2000 | Maruyama ................... 359/719 |
| 6,191,889 | B1 | 2/2001 | Maruyama ................... 359/566 |
| 6,192,021 | B1 | 2/2001 | Saito et al. ................. 369/53.2 |
| 6,313,956 | B1 | 11/2001 | Saito ........................... 359/721 |
| 6,370,103 | B1 | 4/2002 | Yamazaki et al. ...... 369/112.26 |
| 6,480,344 | B1 | * 11/2002 | Maruyama ................... 359/721 |
| 6,594,222 | B2 | 7/2003 | Maruyama ............. 369/112.26 |
| 2003/0103271 | A1 | * 6/2003 | Ohta ........................... 359/719 |

FOREIGN PATENT DOCUMENTS

JP 11337818 12/1999

* cited by examiner

Primary Examiner—Scott J. Sugarman
Assistant Examiner—Darryl J. Collins
(74) Attorney, Agent, or Firm—Greenblum & Bernstein, P.L.C.

(57) ABSTRACT

An objective lens for an optical pickup has a single lens element. One surface of the objective lens is divided into a central area and a peripheral area, and a step providing a level difference along a direction of the optical axis is formed at a boundary therebetween. The step provides a phase shift between light passing through the central area and the peripheral area. The level difference is formed such that a thickness on the peripheral area side is greater than a thickness on the central area side at the boundary. In one case, the objective lens satisfies a condition:

$$0.83 < hx/hmax < 0.97,$$

where hx is a radius of the boundary, and hmax is an effective radius defining a numerical aperture of the surface formed with the step.

18 Claims, 12 Drawing Sheets

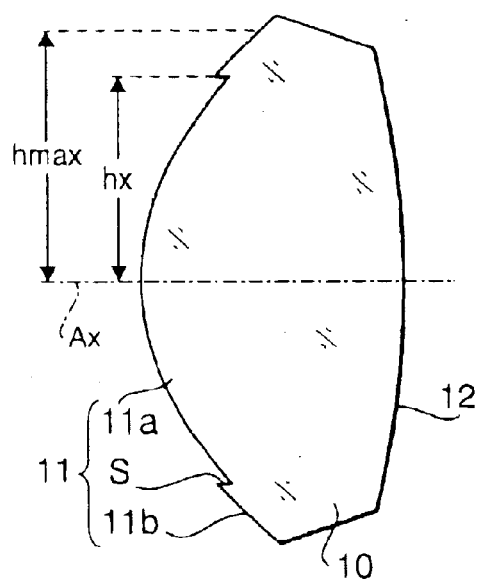
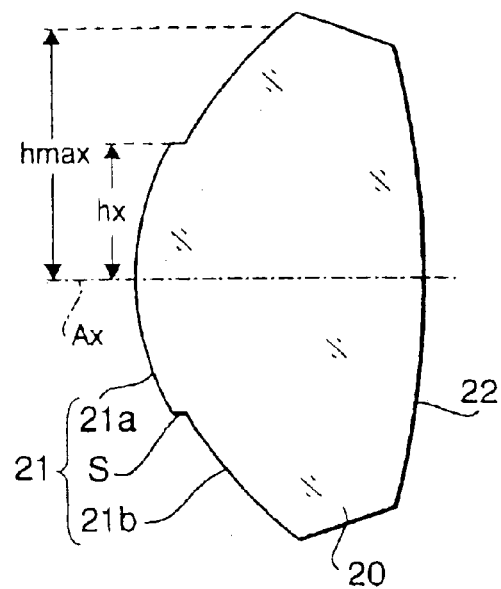
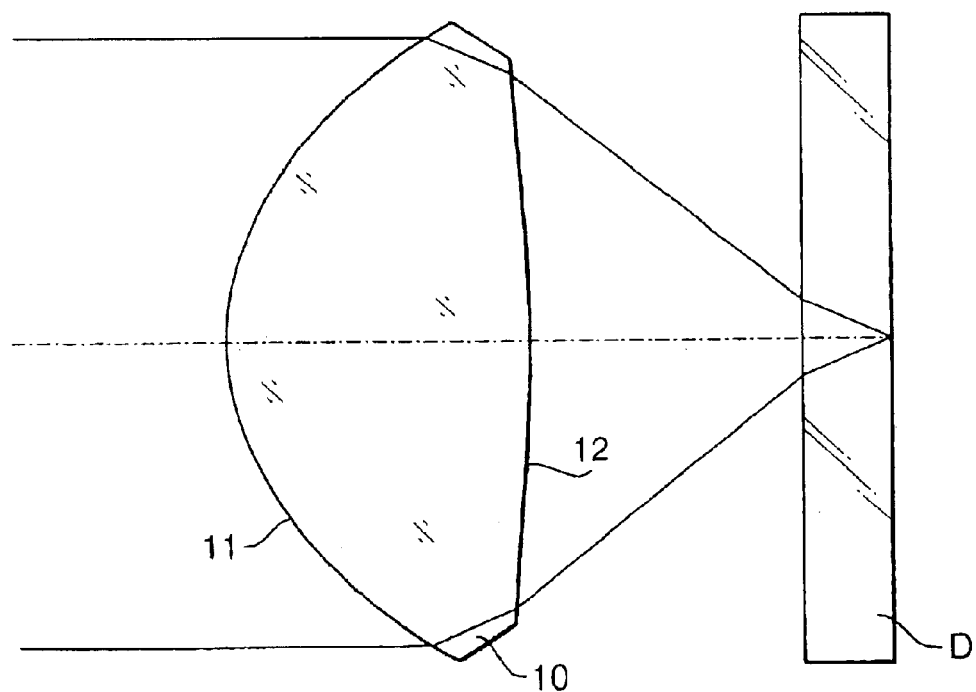

OBJECTIVE LENS FOR OPTICAL PICKUP

BACKGROUND OF THE INVENTION

The present invention relates to an objective lens for optical pickup employed in an optical disc drive.

In an optical pickup, a plastic objective lens is generally used for decreasing a manufacturing cost. However, change of refractive index due to temperature change, and a linear expansion coefficient of the plastic lens are relatively large in comparison with those of a glass lens. Accordingly, deterioration of an optical performance of the plastic lens due to the temperature change is relatively large.

For a low NA objective lens for an optical disc having a relatively small data density, such a deterioration is within an allowable range. However, for a high NA objective lens for an optical disc having a relatively high data density (e.g., DVD: Digital Versatile Disc), the deterioration due to the temperature change exceeds the allowable range, and it is necessary to compensate for the deterioration of the optical performance.

In Japanese Patent Provisional Publication HEI 11-337818, such a problem is dealt with as follows. When the temperature changes, the wavelength of a semiconductor laser, which is a light source, also changes. According to the publication, a minute diffraction lens structure is formed on a surface of a refraction lens so that spherical aberration varies when the wavelength of the beam changes, and the deterioration of the performance due to the temperature changes is absorbed by the change of the spherical aberration due to the change of the wavelength of the light source. Such a lens is typically manufactured by forming the diffraction lens pattern in a metal molding, and in accordance with an injection molding method using the metal molding.

The diffraction lens structure has a number of zones, and therefore, it is relatively troublesome to process the metal molding. Further, since the width of the zones is smaller at a peripheral area of the lens surface, a minute cutting tool should be used. The minute cutting tool is, however, easy to be worn out, and thus the cutting tools should be exchanged frequently. Thus, the manufacturing cost increases if the configuration described above is employed.

SUMMARY OF THE INVENTION

The present invention is advantageous in that the deterioration of the optical performance of the objective lens is well suppressed, and further, processing of a metal molding for such an objective lens is easy and the manufacturing cost can be lowered.

According to an aspect of the invention, there is provided an objective lens for an optical pickup having a single lens element having two refraction surfaces. One of the two refraction surfaces is divided into a central area including an optical axis of the objective lens and a peripheral area outside the central area, and a step providing a level difference along a direction of the optical axis being formed at a boundary between the central area and the peripheral area. The step providing a phase shift between light passing through the central area and light passing through the peripheral area. The phase shift suppresses deterioration of wavefront aberration due to a change of temperature. The level difference is formed such that a thickness on the peripheral area side is greater than a thickness on the central area side at the boundary, the objective lens being configured to satisfy a condition:

0.83<hx/hmax<0.97, wherein, hx is a radius of the boundary, and hmax is an effective radius defining a numerical aperture of the surface formed with the step.

Optionally, the objective lens may be configured to satisfy a condition:

0.88<hx/hmax<0.93.

Further optionally, the step may be formed to satisfy condition:

−14<N×λ<0 [μm], where, N is an optical path difference (unit: λ) of a ray passing through the peripheral area with respect to a ray passing through the central area, and λ is a design wavelength (unit: μm).

Still optionally, the step may be configured to satisfy a condition:

$$0.07 < \frac{N \times \lambda}{NA^4} \times \left( \frac{\lambda(n'-1)}{\lambda'(n-1)} - 1 \right) < 1.20 \ [\mu m],$$

where, N represents an optical path difference (unit: λ) of a ray passing the peripheral area with respect to a ray passing the central area, NA represents a numerical aperture of the objective lens, λ represents a design wavelength [μm], λ' represents a wavelength at a changed temperature [μm], n represents a refractive index of material of the objective lens at the design wavelength, and n' represents a refractive index of the material of the objective lens at a wavelength at the changed temperature.

Optionally, the step may be formed to satisfy a condition:

$$0.22 < \frac{N \times \lambda}{NA^4} \times \left( \frac{\lambda(n'-1)}{\lambda'(n-1)} - 1 \right) < 0.62 \ [\mu m].$$

In the above cases, it may be convenient if N is an integer.

Further optionally, the objective lens may be formed using a molding which is processed using rounded corner cutting tool.

According to another aspect of the invention, there is provided an objective lens for an optical pickup having a single lens element having two refraction surfaces. One of the two refraction surfaces is divided into a central area including an optical axis of the objective lens and a peripheral area outside the central area, and a step providing a level difference along a direction of the optical axis is formed at a boundary between the central area and the peripheral area. The step provides a phase shift between light passing through the central area and light passing through the peripheral area, the phase shift suppressing deterioration of wavefront aberration due to a change of temperature, the level difference being formed such that a thickness on the central area side is greater than a thickness on the peripheral area side at the boundary. The objective lens is configured to satisfy a condition:

0.34<hx/hmax<0.60, where hx is a radius of the boundary, and hmax is an effective radius defining a numerical aperture of the surface formed with the step.

Optionally, the objective lens may be configured to satisfy a condition:

0.41<hx/hmax<0.55.

Optionally, the step is formed to satisfy a condition:

0<N×λ<12 [μm], where N is an optical path difference (unit: λ) of a ray passing through the peripheral area with respect to a ray passing through the central area, and λ is a design wavelength (unit: μm).

Further optionally, the step is configured to satisfy a condition:

$$-1.20 < \frac{N \times \lambda}{NA^4} \times \left(\frac{\lambda(n'-1)}{\lambda'(n-1)} - 1\right) < -0.07 \ [\mu m],$$

where N represents an optical path difference (unit: λ) of a ray passing the peripheral area with respect to a ray passing the central area, NA represents a numerical aperture of the objective lens, λ represents a design wavelength [μm], λ' represents a wavelength at a changed temperature [μm], n represents a refractive index of material of the objective lens at the design wavelength, and n' represents a refractive index of the material of the objective lens at a wavelength at the changed temperature.

Still optionally, the step may be formed to satisfy a condition:

$$-0.05 < \frac{N \times \lambda}{NA^4} \times \left(\frac{\lambda(n'-1)}{\lambda'(n-1)} - 1\right) < -0.22 \ [\mu m].$$

It may be convenient if N is an integer.

Further optionally, the objective lens may be formed using a molding which is processed using an R cutting tool.

BRIEF DESCRIPTION OF THE ACCOMPANYING DRAWINGS

FIG. 1A is a cross-sectional side view of an objective lens according to a first embodiment of the invention;

FIG. 1B is a cross-sectional side view of an objective lens according to a second embodiment of the invention;

FIG. 2 is a lens diagram showing the objective lens according to a first example and an optical disc;

Figure 23A:
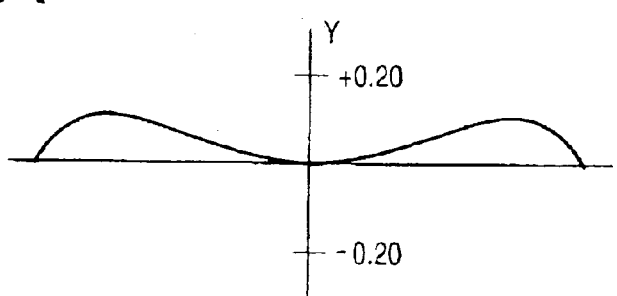
Figure 23B:
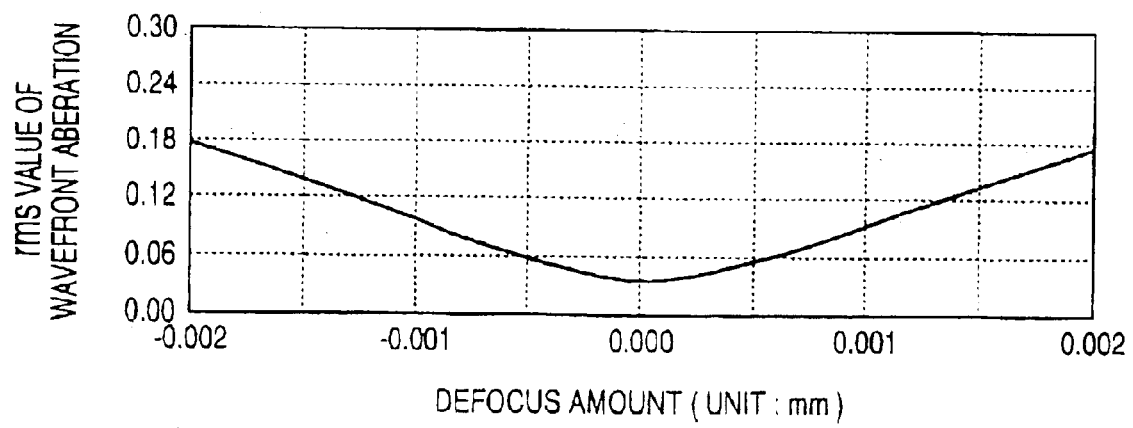

FIG. 23A is a graph showing axial wavefront aberration when the temperature of an objective lens according to a sixth comparative example is increased from a reference temperature by +40° C.; and FIG. 23B is a graph showing a relationship between a defocus amount and an rms value of the wavefront aberration when temperature of the objective lens according to the sixth comparative example is increased from a reference temperature by +40° C.

DESCRIPTION OF THE EXAMPLES

Hereinafter, objective lenses for an optical pickup according to the embodiments will be described with reference to the accompanying drawings.

FIG. 1A is a cross-sectional side view of an objective lens 10 according to a first embodiment of the invention, and FIG. 1B is a cross-sectional side view of an objective lens 20 according to a second embodiment of the invention. Each of the objective lenses 10 and 20 functions to converge an incident laser beam, which is emitted by a laser diode and is incident as parallel light, on a data recording surface of an recording medium (e.g., an optical disc) to form a beam spot thereon.

The objective lens 10 is a single-element plastic lens which is configured such that a first surface 11 is an aspherical surface and a second surface 12 is an aspherical surface or a spherical surface. The first surface 11 is divided into a central area 11a including an optical axis Ax thereof, and a peripheral area 11b on the peripheral side of the central area 11a. At a boundary between the central area 11a and the peripheral area 11b, a step (i.e., a level difference) S is formed, a side surface of the step is parallel with the optical axis Ax.

The step S is formed such that, the central area 11a is lower than the peripheral area 11b at the boundary. In other words, the peripheral area 11b is thicker than the central area 11a in the vicinity of the step S.

The position of the boundary, where the step S is formed, is determined to satisfy condition (1), and preferably, condition (2). Further, the level difference of the step S satisfies conditions (3) and (4), and preferably, condition (5).

$$0.83 < hx/hmax < 0.97 \quad (1)$$

$$0.88 < hx/hmax < 0.93 \quad (2)$$

$$-14 < N \times \lambda < 0 \ [\mu m] \quad (3)$$

$$0.07 < \frac{N \times \lambda}{NA^4} \times \left( \frac{\lambda(n'-1)}{\lambda'(n-1)} - 1 \right) < 1.20 \ [\mu m] \quad (4)$$

$$0.22 < \frac{N \times \lambda}{NA^4} \times \left( \frac{\lambda(n'-1)}{\lambda'(n-1)} - 1 \right) < 0.62 \ [\mu m] \quad (5)$$

where, hx represents a radius of the boundary position, hmax represents an effective radius determining the NA of the surface having the step S, N represents an optical path difference (unit: λ) of a ray passing the peripheral area 11b with respect to a ray passing the central area 11a, λ represents a design wavelength [μm].

NA represents a numerical aperture of the objective lens,

λ' represents a wavelength at a changed temperature [μm], n represents a refractive index at the design wavelength, and n' represents a refractive index for the wavelength at the changed temperature.

The objective lens 20 is a single-element plastic lens which is configured such that a first surface 21 is an aspherical surface and a second surface 22 is an aspherical surface or a spherical surface. The first surface 21 is divided into a central area 21a including an optical axis Ax thereof, and a peripheral area 21b on the peripheral side of the central area 21a. At a boundary between the central area 21a and the peripheral area 21b, a step (i.e., a level difference) S is formed, a side surface of the step is parallel with the optical axis Ax.

The step S is formed such that, the central area 21a is higher than the peripheral area 21b at the boundary. In other words, the peripheral area 21b is thinner than the central area 21a in the vicinity of the step S.

The position of the boundary, where the step S is formed, is determined to satisfy condition (6), and preferably, condition (7). Further, the level difference of the step S satisfies conditions (8) and (9), and preferably, condition (10).

$$0.34 < hx/hmax < 0.60 \quad (6)$$

$$0.41 < hx/hmax < 0.55 \quad (7)$$

$$0 < N \times \lambda < 12 \ [\mu m] \quad (8)$$

$$-1.20 < \frac{N \times \lambda}{NA^4} \times \left( \frac{\lambda(n'-1)}{\lambda'(n-1)} - 1 \right) < -0.07 \ [\mu m] \quad (9)$$

$$-0.05 < \frac{N \times \lambda}{NA^4} \times \left(\frac{\lambda(n'-1)}{\lambda'(n-1)} - 1\right) < -0.22 \ [\mu m] \quad (10)$$

where, hx represents a radius of the boundary position,
hmax represents an effective radius determining the NA of the surface having the step S.
N represents an optical path difference (unit: $\lambda$) of a ray passing the peripheral area 21b with respect to a ray passing the central area 21a,
$\lambda$ represents a design wavelength [$\mu$m],
NA represents a numerical aperture of the objective lens,
$\lambda'$ represents a wavelength at a changed temperature [$\mu$m],
n represents a refractive index at the design wavelength, and
n' represents a refractive index at the temperature-changed wavelength.

According to the above configuration, since the wavefront of the light passed through the peripheral area (11b, 21b) is shifted with respect to the wavefront of light passed through the central area (11a, 21a) by a predetermined amount, wavefront aberration at the design temperature is suppressed to a lower level, and even if the refractive index changes and/or linear expansion occurs due to the change of the temperature, deterioration of the wavefront aberration is well suppressed.

When the peripheral area 11b is protruded with respect to the central area 11a at the step S, as shown in FIG. 1A, by forming the step S so as to satisfy conditions (1) through (5), deterioration of the wavefront aberration can be effectively suppressed. When the central area 21a is protruded with respect to the peripheral area 21b at the step S, by forming the step S to satisfy conditions (6) through (10), deterioration of the wavefront aberration can be effectively suppressed. In the meantime, it should be noted that, the level difference between the central area 11a, 21a and the peripheral area 11b, 21b is exaggerated in FIGS. 1A and 1B for the sake of explanation.

Next, a calculation for obtaining a boundary position Hx and a height of the step S (the level difference, or an optical path difference) for minimizing the rms value of the wavefront aberration is described. When the lens provides spherical aberration, OPD(H) (an optical path difference between a ray passing a point whose height from the optical axis is H and a ray on the optical axis) is expressed as $CH^4$, where C is a constant. In the above expressions, the heights H and Hx are normalized values with assuming the effective radius hmax of the objective lens as 1 (one).

The rms value of the wavefront aberration is calculated as follows.

$$\sqrt{\frac{1}{\pi} r^2 \int (CH^4 + BH^2 + A)^2 2\pi H dH}$$

where A and B are constants, and r is a radius of an incident pupil of the objective lens.

At an arbitrary boundary height Hx, if the wavefront aberration provided by the peripheral area with respect to that provided by the central area is shifted by $\delta$, the rms value of the wavefront aberration is expressed as follows.

$$\sqrt{\frac{1}{\pi} \left[\int_0^{Hx} (CH^4 + BH^2 + A)^2 2\pi H dH + \int_{Hx}^1 (CH^4 + BH^2 + A + \delta)^2 2\pi H dH\right]},$$

By optimizing the values B, A, $\delta$ and Hx to have minimum values, respectively, the rms value of the wavefront aberration can be minimized.

In order to optimize the values B, A, $\delta$ and Hx, firstly the terms in the brackets are modified as indicated below.

$$\int_0^{Hx}(CH^4+BH^2+A)^2 2\pi HdH + \int_{Hx}^1(CH^4+BH^2+A+\delta)^2 2\pi HdH = \quad (11)$$

$$2\pi\left[\frac{C^2}{10}+\frac{B^2}{6}+\frac{A^2}{2}+\frac{(1-Hx^2)(2A\delta+\delta^2)}{2}+\right.$$

$$\left.\frac{CB}{4}+\frac{BA}{2}+\frac{B\delta(1-Hx^4)}{2}+\frac{CA}{3}+\frac{C\delta(1-Hx^6)}{3}\right]$$

Next, the thus obtained expression is differentiated with respect to $\delta$, A, B and Hx, respectively.

(a) differentiation with respect to $\delta$ $$0 = 2\pi\left[(1-Hx^2)A+(1-Hx^2)\delta+\frac{(1-Hx^4)B}{2}+\frac{(1-Hx^6)C}{3}\right] \quad (12)$$

$$= 2\pi(1-Hx^2)\left[A+\delta+\frac{(1+Hx^2)B}{2}+\frac{(1+Hx^2+Hx^4)C}{3}\right]$$

$$\delta = -\left[A+\frac{(1+Hx^2)B}{2}+\frac{(1+Hx^2+Hx^4)C}{3}\right]$$

(b) differentiation with respect to A $$0 = 2\pi\left[A+(1-Hx^2)\delta+\frac{B}{2}+\frac{C}{3}\right] \quad (13)$$

$$A = -\left[(i-Hx^2)\delta+\frac{B}{2}+\frac{C}{3}\right]$$

(c) differentiation with respect to B $$0 = 2\pi\left[\frac{B}{3}+\frac{C}{4}+\frac{A}{2}\frac{(1-Hx^4)\delta}{2}\right] \quad (14)$$

$$B = -\left[\frac{3(1-Hx^4)\delta}{2}+\frac{3A}{2}+\frac{3C}{4}\right]$$

(d) differentiation with respect to Hx $$0 = -2\pi\lfloor Hx(2A\delta+\delta^2)+2B\delta Hx^3+2C\delta Hx^5 \rfloor \quad (15)$$

$$0 = (2A+\delta^2)+2BHx^2+2CHx^4$$

By solving the simultaneous equations (12)–(15), the followings are obtained:

$$Hx = \sqrt{\frac{3\pm\sqrt{3}}{6}} \quad (16)$$

$$\delta = \frac{1-2Hx^2}{6(1-3Hx^2+3x^4)}C \quad (17)$$

Therefore, when the step S is formed at a boundary position Hx≅0.89 or Hx≅46, the rms value of the wavefront aberration has the minimum value. Condition (1) defines a range including the boundary position of 0.89, while condition (6) defines a range including the boundary position of 0.46. When one of these conditions is satisfied, the rms value of the wavefront aberration is suppressed to a small value. If a further restrictive condition (2) or (7) is satisfied, the rms value of the wavefront aberration is further suppressed.

Next, a height of the step S (i.e., the level difference between the first surface and the second surface at the boundary) is calculated.

The shifting amount δ of the wavefront aberration value which minimizes the rms value of the wavefront aberration $OPD(H)=CH^4+BH^2+A$ is obtained by substituting equation (16) in equation (17). With this calculation, the shifting amount is obtained such that δ=±0.19245C (unit: λ).

Next, the appropriate height of the step S (i.e., OPD) which causes an OPD of δ, when the temperature increases +40 degrees is determined.

When the wavelength and the refractive index after the temperature has changed are represented by λ' and n', the following equations are obtained.

$$\delta = N\lambda/(n-1)/(\lambda'/(n'-1)) - N$$
$$= N(\lambda(n'-1)/((n-1)L')-1)$$

Therefore, $$N = \delta/(\lambda(n'-1)/((n-1)\lambda')-1)$$

According to the first embodiment, C=−0.998, δ=0.1912, λ=660 nm, n=1.54044, λ'=668 nm and n'=1.54015. Therefore, $$N = \delta/(\lambda(n'-1)/((n-1)\lambda')-1)$$
$$= 0.1912/(660(1.54015-1)/((1.54044-1)668)-1$$
$$= -15.36218$$

That is, when the optical path difference is Nλ, the wavefront aberration provided by the step S when the temperature has changed can be brought into a desired value. However, if the optical path difference provided by the step S includes a decimal part, aberrations are generated at a reference status (before the temperature increases). Therefore, the optical path difference at the step S in the reference status should be an integer. Accordingly, an actual level difference at the step S is determined such that N=−15, which is determined by rounding the decimal part.

By forming the step S such that the optical path of a ray passing through the peripheral area of the step S is longer than that passing through the central area of the step S by 15λ, the deterioration of the optical performance of the objective lens due to the temperature change can be suppressed.

Condition (3) indicated above is a generalized condition of the height of the step S for forming the central area to be subsided with respect to the peripheral area. Condition (8) represents a generalized condition of the height of the step S for forming the central area as a protruded portion with respect the peripheral area. By forming the object lens to satisfy the condition (3) or (8), deterioration of the optical performance of the objective lens due to the change of the temperature can be suppressed.

In the above description, a case where the temperature increases by 40 degrees. It should be noted that within a temperature range of ±60° C., the refractive index changes substantially linearly as the change of the wavelength. Thus, the temperature change is within this range, the wavefront aberration can be suppressed with the same configuration of the step S described above.

Condition (4) defines a height condition of the step S when the central area is subsided with respect to the peripheral area, which condition takes the change of the wavelength due to the temperature change and the change of the refractive index into account.

If the value exceeds the upper limit of condition (4), the shifting amount of the wavefront aberration provided by the peripheral area becomes too large with respect to that provided by the central area when the temperature changes. In such a case, the aberration is overcorrected and thus the rms value of the wavefront aberration cannot be made small.

If the value is lower than the lower limit of condition (4), the shifting amount of the wavefront aberration is too small, and the aberration is undercorrected. Also in this case, the rms value of the wavefront aberration cannot be made small. Condition (5) defines a narrower range than the range defined in condition (4), and thus, the rms value of the wavefront aberration can be suppressed effectively.

Condition (9) defines the height condition of the step S when the central area is protruded with respect to the peripheral area, which condition takes the change of the wavelength due to the temperature change and the change of the refractive index into account.

If the value exceeds the upper limit of condition (9), the shifting amount of the wavefront aberration provided by the peripheral area becomes too small with respect to that provided by the central area when the temperature changes. In such a case, the aberration is undercorrected and thus the rms value of the wavefront aberration cannot be made small.

If the value is lower than the lower limit of condition (9), the shifting amount of the wavefront aberration is too large, and the aberration is overcorrected. Also in this case, the rms value of the wavefront aberration cannot be made small. Condition (10) defines a narrower range than the range defined in condition (9), and thus, the rms value of the wavefront aberration can be suppressed effectively.

Next, concrete examples according to the invention will be described. First through third, sixth and seventh examples are for an optical disc having a cover layer of 0.6 mm thick. Fourth example is for an optical disc whose cover layer is 0.1 mm thick. Fifth example is for an optical disc whose cover layer is 1.2 mm thick. The first, second, fourth, fifth and sixth examples employ the objective lens according to the first embodiment, and the third and seventh examples employ the objective lens according to the second embodiment.

FIRST EXAMPLE

FIG. 2 is a diagram showing the objective lens 10 and the cover layer D of the optical disc. It should be noted that, in the lens diagrams illustrating the configuration of the examples, the step S is indicated with the same scale ratio as the other portion, and accordingly, the height cannot be indicated as a visible step in the drawings.

The numerical structure is indicated in TABLE 1. In TABLE 1 and following TABLEs for the other examples, f represents a focal length, NA represents a numerical aperture, λ represents a design wavelength, r is a radius of curvature of a lens surface (unit: mm), d represents a distance, on the optical axis, between adjacent surfaces (unit: mm), and n represents a refractive index at the design wavelength λ. Surface number #1 and #2 represent the first and second surfaces 11 and 12 of the objective lens 10, respectively, and surface number #3 and #4 represent both surfaces of the cover layer D of the optical disc.

TABLE 1

| f = 3.30 mm | NA = 0.65 | λ = 660 nm | |
|---|---|---|---|
| surface | r | d | n |
| 1 | 2.0600 | 2.0000 | 1.54044 |
| 2 | −8.7800 | 1.7970 | — |
| 3 | ∞ | 0.6000 | 1.57961 |
| 4 | ∞ | — | — |

The first surface 11 is divided into the central area and the peripheral area by the boundary whose height with respect to the optical axis is hx. The central area is subsided with respect to the peripheral area. These areas are rotationally symmetrical aspherical surfaces having different shapes, with the step S (i.e., the level difference) formed therebetween. The second surface 12 is a rotationally symmetrical aspherical surface having no steps.

The radius of the first surface 11 indicated in TABLE 1 is a paraxial radius of the central area 11a. The radius of the second surface 12 in TABLE 1 is a paraxial radius of the second surface 12.

Generally, the rotationally symmetrical aspherical surface is expressed by following formula:

$$X(h) = \frac{Ch^2}{1+\sqrt{1-(1+\kappa)C^2 h^2}} + A_4 h^4 + A_6 h^6 + A_8 h^8 + A_{10} h^{10} + A_{12} h^{12} + \Delta N$$

where, X(h) represents a sag amount, which is a distance from a plane tangential, at the optical axis, to the aspherical surface, of a point whose height with respect to the optical axis is h, C represents a curvature (1/r) of the aspherical surface on the optical axis, $\kappa$ represents a conical coefficient, and $A_4$, $A_6$, $A_8$, $A_{10}$ and $A_{12}$ are fourth, sixth, eights, tenth and twelfth aspherical coefficients. $\Delta$ is a level difference at the boundary (represented by $\lambda/(n-1)$) corresponding to one wavelength in a direction parallel to the optical axis, and N represents an OPD of the peripheral area with respect to the central area (unit: $\lambda$).

An effective radius hmax, the boundary height hx, the paraxial radii r of the central and peripheral areas, the conical coefficient $\kappa$, the aspherical coefficients $A_4$, $A_6$, $A_8$, $A_{10}$ and $A_{12}$, a product $\Delta N$ ($\Delta$ being the level difference) and the OPD N. are indicated in TABLE 2.

TABLE 2 hmax = 2.15 mm   hx = 1.96 mm

| | FIRST SURFACE | | SECOND |
| --- | --- | --- | --- |
| | CENTRAL AREA | PERIPHERAL AREA | SURFACE |
| r | 2.0600 | 2.0664 | −8.7800 |
| $\kappa$ | −0.5000 | −0.5000 | 0.0000 |
| $A_4$ | −2.9870 × 10$^{-4}$ | −2.9210 × 10$^{-4}$ | 1.2360 × 10$^{-2}$ |
| $A_6$ | 4.6600 × 10$^{-5}$ | 4.6890 × 10$^{-5}$ | −1.4820 × 10$^{-3}$ |
| $A_8$ | −1.0520 × 10$^{-5}$ | −1.0700 × 10$^{-5}$ | 8.3360 × 10$^{-5}$ |
| $A_{10}$ | 7.0450 × 10$^{-6}$ | 6.9560 × 10$^{-6}$ | 0.0000 |
| $A_{12}$ | −1.3670 × 10$^{-6}$ | −1.3276 × 10$^{-6}$ | 0.0000 |
| $\Delta N$ | — | −0.01832 | — |
| N | — | −15 | — |

Figure 3A:
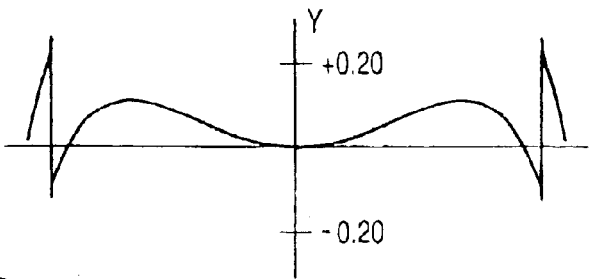
FIG. 3A is a graph showing axial wavefront aberration when the temperature of the objective lens according to the first example is increased from a reference temperature by +40° C.
Figure 3B:
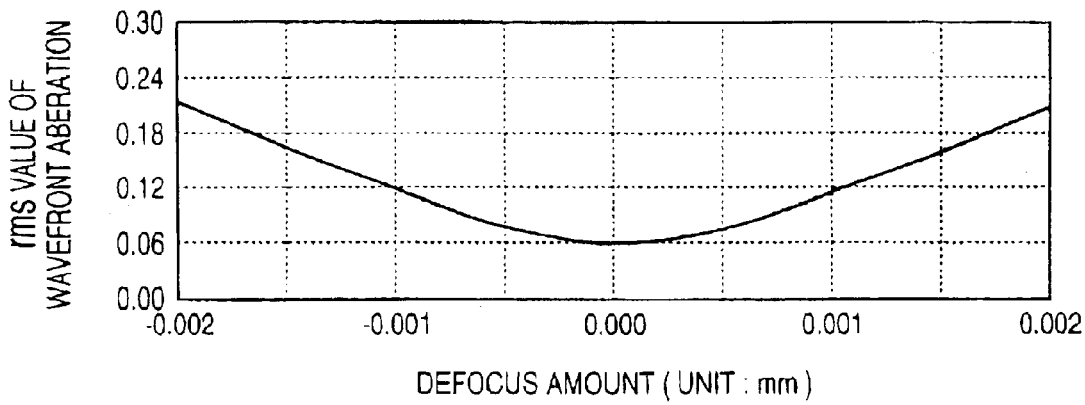
FIG. 3B is a graph showing a relationship between a defocus amount and an rms value of the wavefront aberration when temperature of the objective lens according to the first example is increased from a reference temperature by +40° C.
Figure 4A:
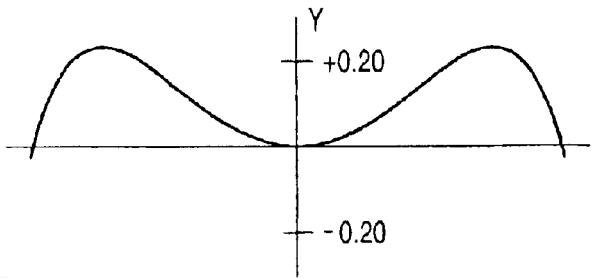
FIG. 4A is a graph showing axial wavefront aberration when the temperature of an objective lens according to a comparative example is increased from a reference temperature by +40° C.
Figure 4B:
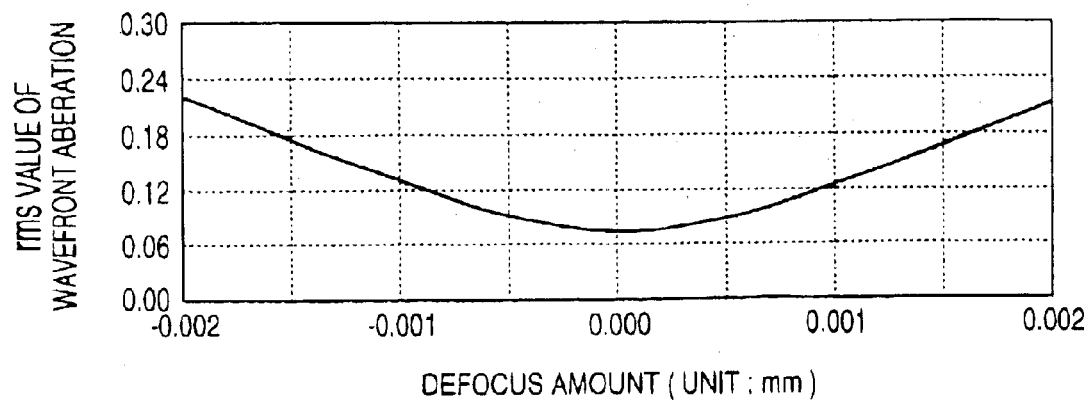
FIG. 4B is a graph showing a relationship between a defocus amount and an rms value of the wavefront aberration when temperature of the objective lens according to the comparative example is increased from a reference temperature by +40° C.

Next, with reference to FIGS. 3A–3B and 4A–4B, the effects of the step S on the wavefront aberration will be described. FIGS. 3A–3B show aberrations when the temperature of the objective lens 10 is increased by 40 degrees with respect to the reference temperature. In particular, FIG. 3A shows a paraxial wavefront aberration, and FIG. 3B shows a relationship between a defocus amount and the rms value of the wavefront aberration. In each graph, the vertical axis represents an amount of the aberration (unit: wavelength), and the horizontal axis of FIGS. 3B represents the defocus amount (nit: mm). FIGS. 4A and 4B show characteristics, which are similar to those shown in FIGS. 3A and 3B, of a comparative example which is similar to the objective lens 10 except that the step S is not formed.

The wavelength $\lambda'$, the refractive index n' of the objective lens 10 and the refractive index n' of the cover layer D of the optical disc after the temperature is increased by 40 degrees are 668 nm, 1.53575 and 1.57469, respectively.

According to the first example, as shown in FIG. 3A, the characteristic of the wavefront aberration includes stepped portions, and the quantity of the aberration at peripheral area is relatively small. Accordingly, as shown in FIG. 3B, the rms value of the wavefront aberration at the in-focus condition (i.e., defocus is zero) is suppressed to 0.058$\lambda$. On the contrary, according to the first comparative example, as shown FIG. 4A, the wavefront aberration at the peripheral area is large, and thus, the rms value of the wavefront aberration at the in-focus condition is 0.074$\lambda$. It is known from the above that the rms value of the wavefront aberration can be reduced by 22% by forming the step S.

Figure 5:
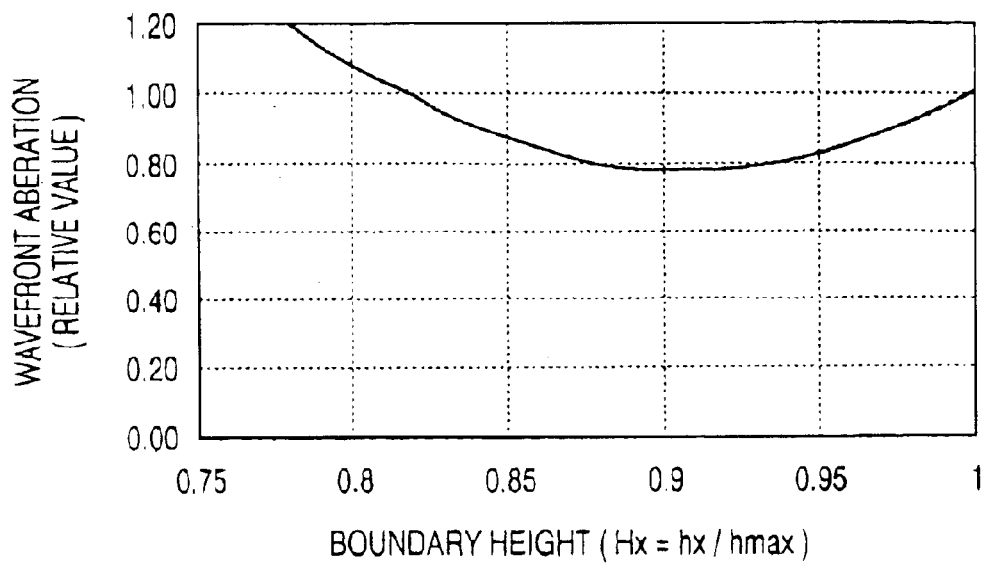
FIG. 5 is a graph showing a relationship between a boundary position of the objective lens according to the first example and the rms value of the wavefront aberration.

In the first example, the boundary position hx is 1.96 mm (Hx=hx/hmax=0.91). Depending on this boundary position hx, the rms value after the temperature change is different. FIG. 5 shows a graph illustrating such a relationship. That is, the vertical axis of the graph represents a relative value of the rms value of the wavefront aberration, and the horizontal axis represents a normalized boundary position Hx. From the graph shown in FIG. 5, when the central area is subsided with respect to the peripheral area, the above indicated condition (1), that is 0.83<hx/hmax<0.97 is appropriate. It should be noted that this condition is effective even though a different design of the lens is used.

SECOND EXAMPLE

Figure 6:
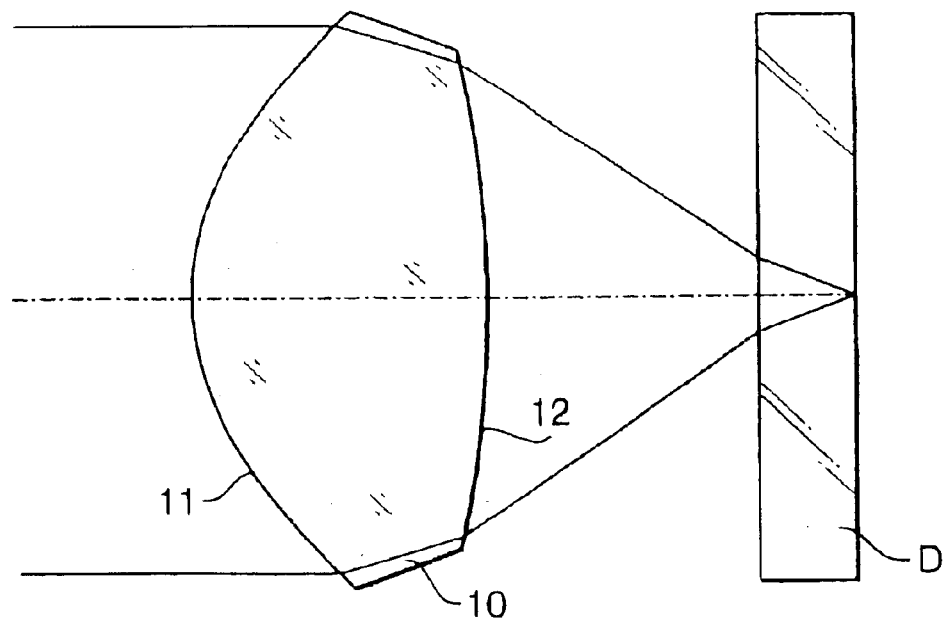
FIG. 6 is a lens diagram showing the objective lens according to the second example and an optical disc.

FIG. 6 is a lens diagram showing the objective lens 10 and the cover layer D of the optical disc. The numerical structure of the second example is indicated in TABLE 3.

TABLE 3 f = 3.00 mm   NA = 0.60   $\lambda$ = 660 nm

| SURFACE | r | d | n |
| --- | --- | --- | --- |
| 1 | 1.9000 | 1.8000 | 1.54044 |
| 2 | −7.3800 | 1.6230 | — |
| 3 | ∞ | 0.6000 | 1.57961 |
| 4 | ∞ | — | — |

The first surface 11 is divided into the central area and the peripheral area by the boundary whose height with respect to the optical axis is hx. The central area is subsided with respect to the peripheral area. These areas are rotationally symmetrical aspherical surfaces having different shapes, with the step S (i.e., the level difference) formed at the boundary thereof. The second surface 12 is a rotationally symmetrical aspherical surface having no steps.

An effective radius hmax, the boundary height hx, the paraxial radii r of the central and peripheral areas, the conical coefficient $\kappa$, the aspherical coefficients $A_4$, $A_6$, $A_8$, $A_{10}$ and $A_{12}$, a product $\Delta N$ and the OPD N are Indicated in TABLE 4.

TABLE 4 hmax = 1.80 mm   hx = 1.60 mm

| | CENTRAL AREA | PERIPHERAL AREA |
| --- | --- | --- |
| r | 1.9000 | 1.9035 |
| $\kappa$ | −0.4700 | −0.4700 |
| $A_4$ | −4.3810 × 10$^{-3}$ | −4.3470 × 10$^{-3}$ |
| $A_6$ | −1.1270 × 10$^{-3}$ | −1.1160 × 10$^{-3}$ |
| $A_8$ | −1.6080 × 10$^{-4}$ | −1.5810 × 10$^{-4}$ |
| $A_{10}$ | −3.2740 × 10$^{-5}$ | −3.2500 × 10$^{-5}$ |
| $A_{12}$ | 1.7740 × 10$^{-6}$ | 1.7576 × 10$^{-6}$ |
| $\Delta N$ | — | −0.00977 |
| N | — | −8 |

Figure 7A:
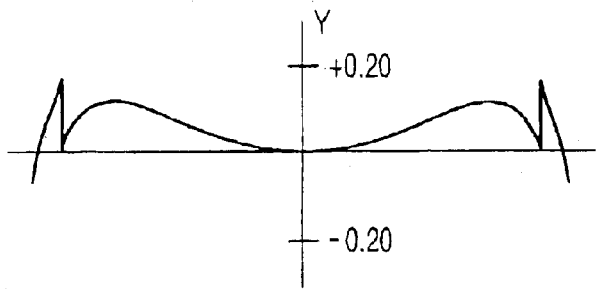
FIG. 7A is a graph showing axial wavefront aberration when the temperature of the objective lens according to the second example is increased from a reference temperature by +40° C.
Figure 7B:
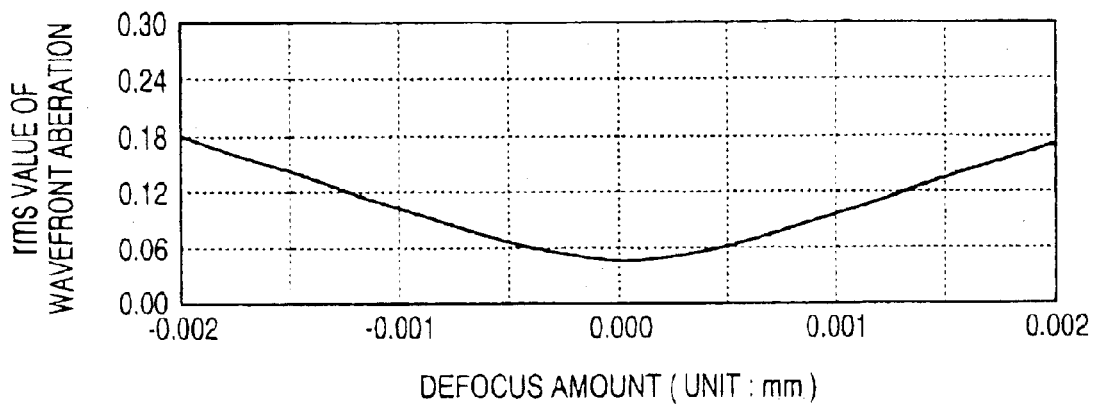
FIG. 7B is a graph showing a relationship between a defocus amount and an rms value of the wavefront aberration when temperature of the objective lens according to the second example is increased from a reference temperature by +40° C.
Figure 8A:
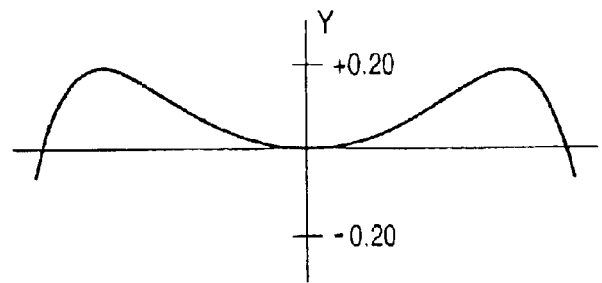
FIG. 8A is a graph showing axial wavefront aberration when the temperature of an objective lens according to a second comparative example is increased from a reference temperature by +40° C.
Figure 8B:
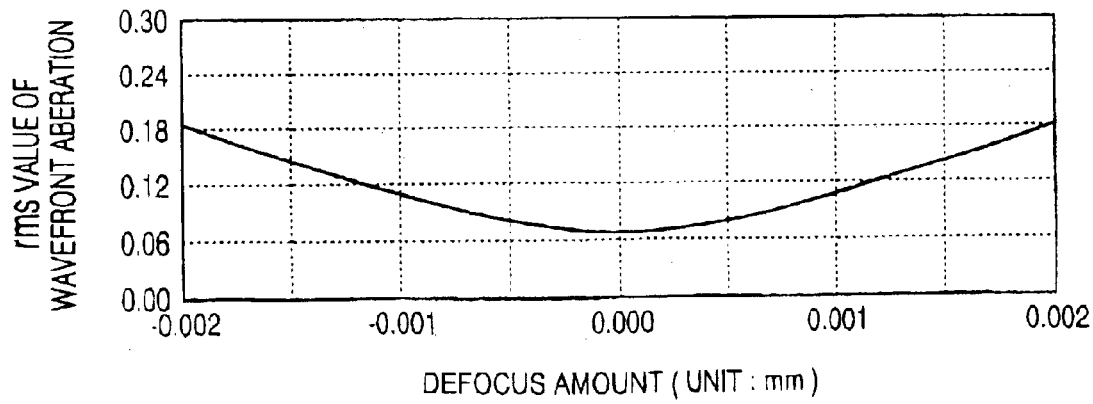
FIG. 8B is a graph showing a relationship between a defocus amount and an rms value of the wavefront aberration when temperature of the objective lens according to the second comparative example is increased from a reference temperature by +40° C.

Next, with reference to FIGS. 7A–7B and 8A–8B, the effects of the step S on the wavefront aberration will be described. FIGS. 7A–7B show aberrations when the temperature of the objective lens 10 is increased by 40 degrees with respect to the reference temperature. In particular, FIG. 7A shows a paraxial wavefront aberration, and FIG. 7B shows a relationship between a defocus amounts and the rms value of the wavefront aberration. In each graph, the vertical axis represents an amount of the aberration (unit: wavelength), and the horizontal axis of FIGS. 7B represents the defocus amount (nit: mm). FIGS. 8A and 8B show characteristics, which are similar to those shown in FIGS. 7A and 7B, of a second comparative example which is similar to the second example except that the step S is not formed.

The wavelength $\lambda'$, the refractive index n' of the objective lens 10 and the refractive index n' of the cover layer D of the optical disc after the temperature is increased by 40 degrees are 668 nm, 1.53575 and 1.57469, respectively.

According to the second example, as shown in FIG. 7A, the characteristic of the wavefront aberration includes stepped portions, and the quantity of the aberration at peripheral area is relatively small. Accordingly, as shown in FIG. 7B, the rms value of the wavefront aberration at the in-focus condition (i.e., defocus is zero) is suppressed to $0.044\lambda$. On the contrary, according to the second comparative example, as shown FIG. 8A, the wavefront aberration at the peripheral area is large, and thus, the rms value of the wavefront aberration at the in-focus condition is $0.068\lambda$. It is known from the above that the rms value of the wavefront aberration can be reduced by 35% by forming the step S.

THIRD EXAMPLE

Figure 9:
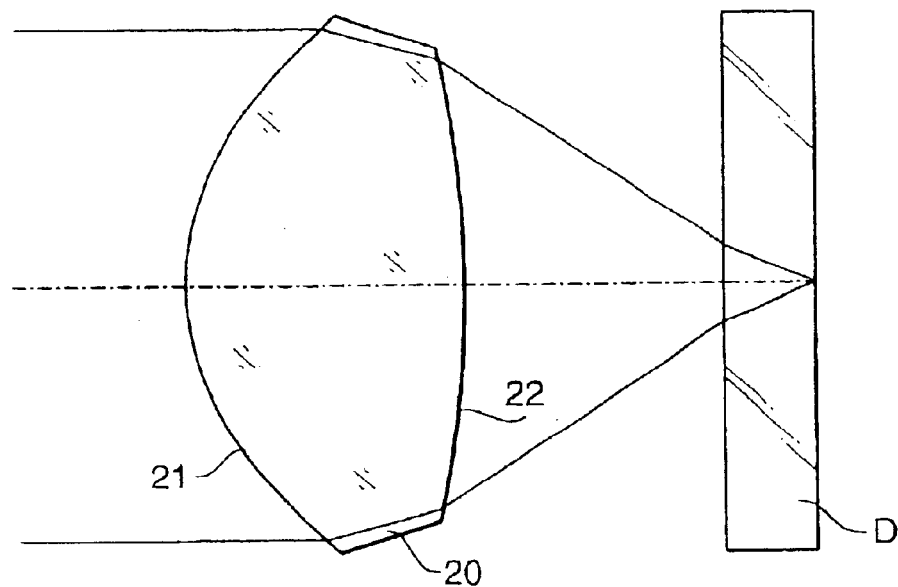
FIG. 9 is a lens diagram showing the objective lens according to the third example and an optical disc.

FIG. 9 is a lens diagram showing the objective lens 20 according to the third example and the cover layer D of the optical disc. The basic numerical structure of the third example is substantially the same as the structure of the second example indicated in TABLE 3.

The first surface 21 is divided into the central area and the peripheral area by the boundary whose height with respect to the optical axis is hx. The central area is protruded with respect to the peripheral area. These areas are rotationally symmetrical aspherical surfaces having different shapes, with the step S (i.e., the level difference) formed at the boundary thereof. The second surface 22 is a rotationally symmetrical aspherical surface having no steps.

An effective radius hmax, the boundary height hx, the paraxial radii r of the central and peripheral areas, the conical coefficient $\kappa$, the aspherical coefficients $A_4$, $A_6$, $A_8$, $A_{10}$ and $A_{12}$, a product $\Delta N$ and the OPD N are indicated in TABLE 5. The values for the central area are the same as those in the second example.

TABLE 5 hmax = 1.80 mm  hx = 0.83 mm

|  | CENTRAL AREA | PERIPHERAL AREA |
|---|---|---|
| r | 1.9000 | 1.8966 |
| $\kappa$ | −0.4700 | −0.4700 |
| $A_4$ | −4.3810 × 10$^{-3}$ | −4.4140 × 10$^{-3}$ |
| $A_6$ | −1.1270 × 10$^{-3}$ | −1.1380 × 10$^{-3}$ |
| $A_8$ | −1.6080 × 10$^{-4}$ | −1.6350 × 10$^{-4}$ |
| $A_{10}$ | −3.2740 × 10$^{-5}$ | −3.2940 × 10$^{-5}$ |
| $A_{12}$ | 1.7740 × 10$^{-6}$ | 1.7832 × 10$^{-6}$ |
| $\Delta N$ | — | 0.00977 |
| N | — | 8 |

Figure 10A:
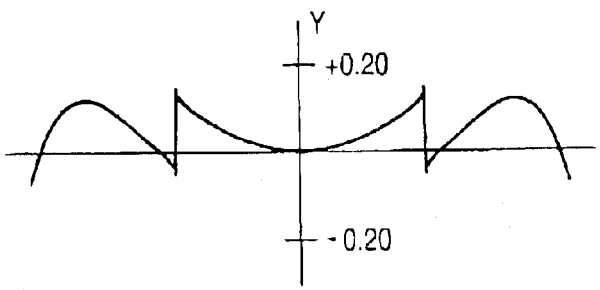
FIG. 10A is a graph showing axial wavefront aberration when the temperature of the objective lens according to the third example is increased from a reference temperature by +40° C.
Figure 10B:
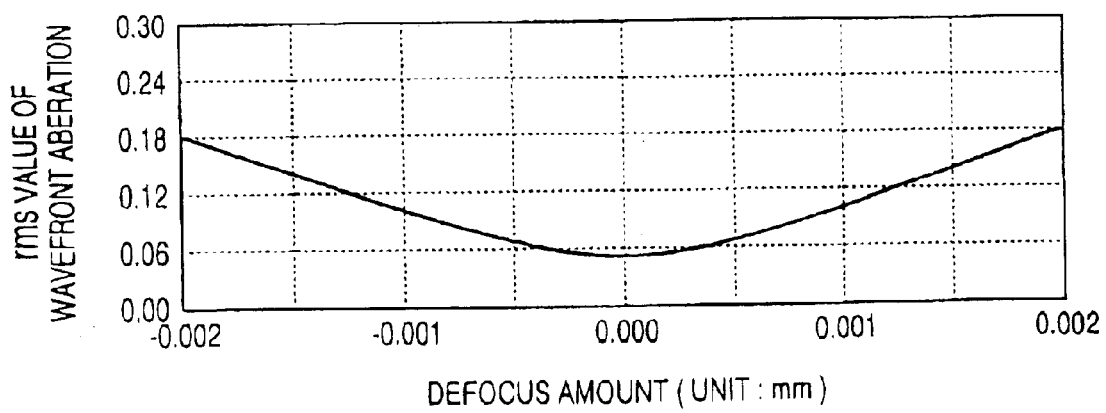
FIG. 10B is a graph showing a relationship between a defocus amount and an rms value of the wavefront aberration when temperature of the objective lens according to the third example is increased from a reference temperature by +40° C.

Next, with reference to FIGS. 10A–10B, the effects of the step S on the wavefront aberration will be described. FIGS. 10A–10B show aberrations when the temperature of the objective lens 20 is increased by 40 degrees with respect to the reference temperature. In particular, FIG. 10A shows a paraxial wavefront aberration, and FIG. 10B shows a relationship between a defocus amounts and the rms value of the wavefront aberration. In each graph, the vertical axis represents an amount of the aberration (unit: wavelength), and the horizontal axis of FIGS. 10B represents the defocus amount (unit: mm). The shape of the objective lens similar to the third example but the step S is not provided is the same as the second comparison example which is shown in FIGS. 8A and 8B.

The wavelength $\lambda'$ the refractive index n' of the objective lens 20 and the refractive index n' of the cover layer D of the optical disc after the temperature is increased by 40 degrees are 668 nm, 1.53575 and 1.57469, respectively.

According to the third example, as shown in FIG. 10A, the characteristic of the wavefront aberration includes stepped portions, and the quantity of the aberration at peripheral area is relatively small. Accordingly, as shown in FIG. 10B, the rms value of the wavefront aberration at the in-focus condition (i.e., defocus is zero) is suppressed to $0.051\lambda$. On the contrary, according to the second comparative example, as shown FIG. 8A, the wavefront aberration at the peripheral area is large, and thus, the rms value of the wavefront aberration at the in-focus condition is $0.068\lambda$. It is known from the above that the rms value of the wavefront aberration can be reduced by approximately 25% by forming the step S.

Figure 11:
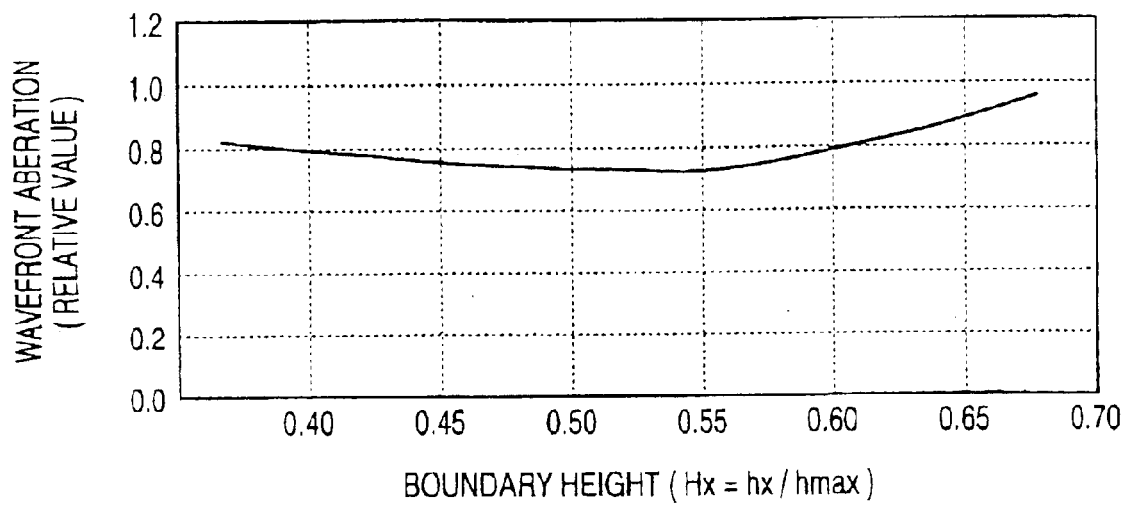
FIG. 11 is a graph showing a relationship between a boundary position of the objective lens according to the third example and the rms value of the wavefront aberration.

In the third example, the boundary position hx is 0.83 mm (Hx=hx/hmax=0.46). Depending on this boundary position hx, the rms value after the temperature change is different. FIG. 11 shows a graph illustrating such a relationship. That is the vertical axis of the graph represents a relative value of the rms value of the wavefront aberration, and the horizontal axis represents a normalized boundary position Hx. From the graph shown in FIG. 11, when the central area is protruded with respect to the peripheral area, the above indicated condition (6), that is 0.34<hx/hmax<0.60 is appropriate. It should be noted that this condition is effective even though a different design of the lens is used.

FOURTH EXAMPLE

Figure 12:
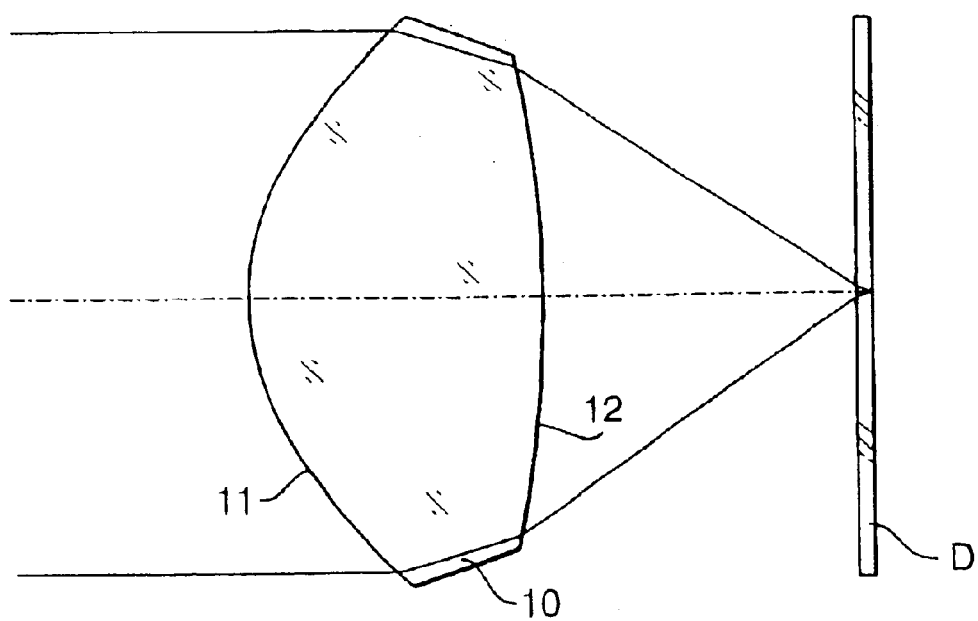
FIG. 12 is a lens diagram showing the objective lens according to the fourth example and an optical disc.

FIG. 12 is a lens diagram showing the objective lens 10 according to the fourth example and the cover layer D of the optical disc. The basic numerical structure of the third example is indicated in TABLE 6.

TABLE 6 f = 3.00 mm  NA = 0.60  $\lambda$ = 405 nm

| SURFACE | r | d | n |
|---|---|---|---|
| 1 | 1.9310 | 1.8000 | 1.56023 |
| 2 | −8.6260 | 1.9340 | — |
| 3 | ∞ | 0.1000 | 1.62231 |
| 4 | ∞ | — | — |

The first surface 11 is divided into the central area and the peripheral area by the boundary whose height with respect to the optical axis is hx. The central area is subsided with respect to the peripheral area. These areas are rotationally symmetrical aspherical surfaces having different shapes, with the step S (i.e., the level difference) formed at the boundary thereof. The second surface 12 is a rotationally symmetrical aspherical surface having no steps.

An effective radius hmax, the boundary height hx, the paraxial radii r of the central and peripheral areas, the conical coefficient $\kappa$, the aspherical coefficients $A_4$, $A_6$, $A_8$, $A_{10}$ and $A_{12}$, a product $\Delta N$ and the OPD N are indicated in TABLE 7.

TABLE 7

| | hmax = 1.80 mm | hx = 1.60 mm |
|---|---|---|
| | CENTRAL AREA | PERIPHERAL AREA |
| r | 1.9310 | 1.9352 |
| κ | −0.5000 | −0.5000 |
| $A_4$ | $-3.6990 \times 10^{-3}$ | $-3.6640 \times 10^{-3}$ |
| $A_6$ | $-9.5130 \times 10^{-4}$ | $-9.3960 \times 10^{-4}$ |
| $A_8$ | $-1.3050 \times 10^{-4}$ | $-1.2840 \times 10^{-4}$ |
| $A_{10}$ | $-2.1870 \times 10^{-5}$ | $-2.1580 \times 10^{-5}$ |
| $A_{12}$ | $1.4424 \times 10^{-6}$ | $1.4120 \times 10^{-6}$ |
| ΔN | — | −0.01157 |
| N | — | −16 |

Figure 13A:
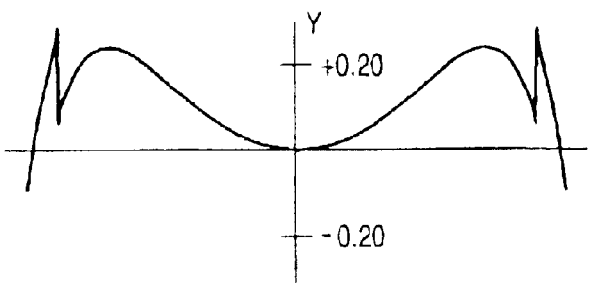
FIG. 13A is a graph showing axial wavefront aberration when the temperature of the objective lens according to the fourth example is increased from a reference temperature by +40° C.
Figure 13B:
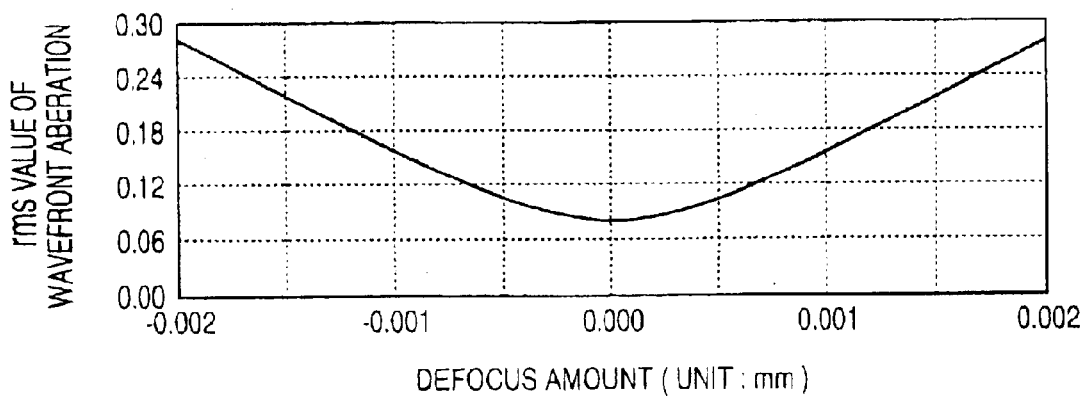
FIG. 13B is a graph showing a relationship between a defocus amount and an rms value of the wavefront aberration when temperature of the objective lens according to the fourth example is increased from a reference temperature by +40° C.
Figure 14A:
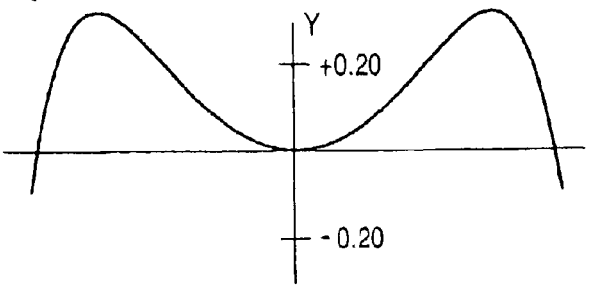
FIG. 14A is a graph showing axial wavefront aberration when the temperature of an objective lens according to a third comparative example is increased from a reference temperature by +40° C.
Figure 14B:
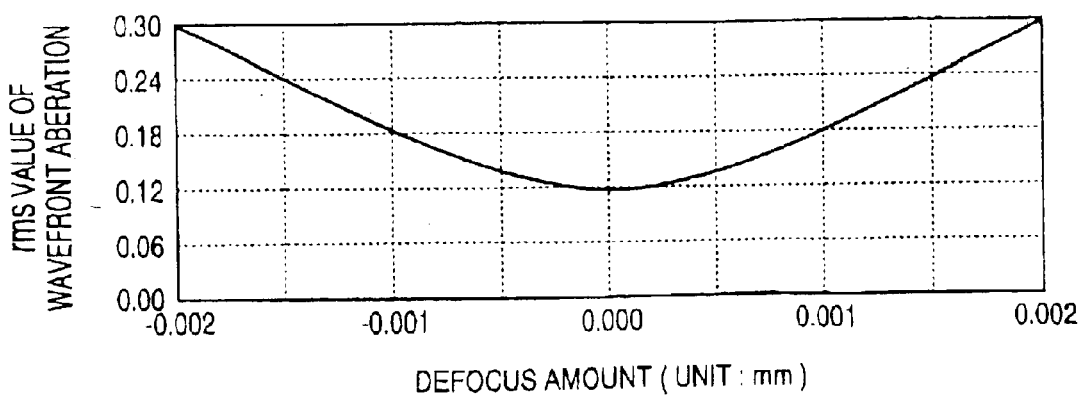
FIG. 14B is a graph showing a relationship between a defocus amount and an rms value of the wavefront aberration when temperature of the objective lens according to the third comparative example is increased from a reference temperature by +40° C.

Next, with reference to FIGS. 13A–13B and 14A–14B, the effects of the step S on the wavefront aberration will be described. FIGS. 13A–13B show aberrations when the temperature of the objective lens 10 is increased by 40 degrees with respect to the reference temperature. In particular, FIG. 13A shows a paraxial wavefront aberration, and FIG. 13B shows a relationship between a defocus amounts and the rms value of the wavefront aberration. In each graph, the vertical axis represents an amount of the aberration (unit: wavelength), and the horizontal axis of FIGS. 13B represents the defocus amount (unit: mm). FIGS. 14A and 14B show characteristics, which are similar to those shown in FIGS. 13A and 13B, of a third comparative example which is similar to the fourth example except that the step S is not formed.

The wavelength λ', the refractive index n' of the objective lens 10 and the refractive index n' of the cover layer D of the optical disc after the temperature is increased by 40 degrees are 407.4 nm, 1.55544 and 1.61694, respectively.

According to the fourth example, as shown in FIG. 13A, the characteristic of the wavefront aberration includes stepped portions, and the quantity of the aberration at the inner portion of the step S is relatively small. Accordingly, as shown in FIG. 13B, the rms value of the wavefront aberration at the in-focus condition (i.e., defocus is zero) is suppressed to 0.084λ. On the contrary, according to the third comparative example, as shown FIG. 14A, the wavefront aberration at the peripheral area is large, and thus, the rms value of the wavefront aberration at the in-focus condition is 0.115λ (see FIG. 14B). It is known from the above that the rms value of the wavefront aberration can be reduced by approximately 27% by forming the step S.

FIFTH EXAMPLE

Figure 15:
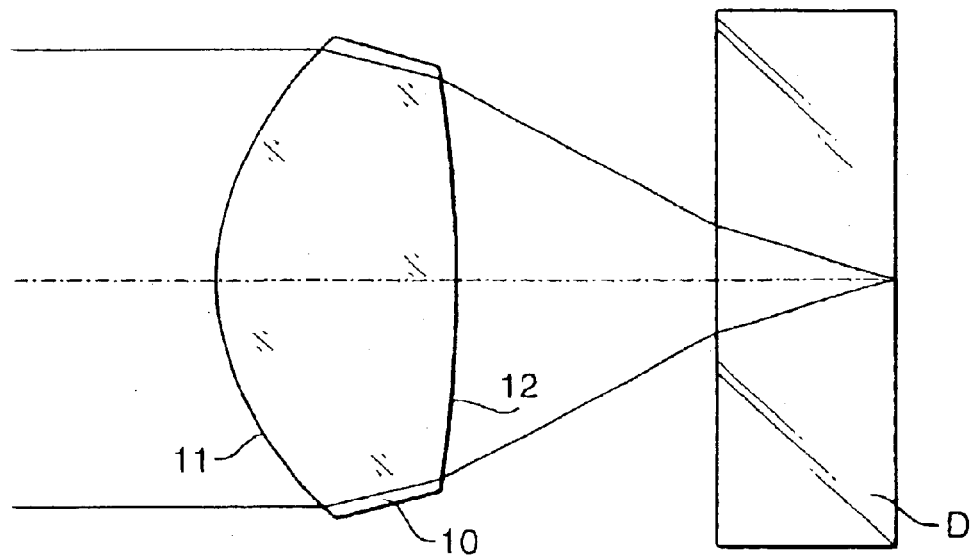
FIG. 15 is a lens diagram showing the objective lens according to the fifth example and an optical disc.

FIG. 15 is a lens diagram showing the objective lens 10 according to the fifth example and the cover layer D of the optical disc. The basic numerical structure of the third example is indicated in TABLE 8.

TABLE 8

| | f = 3.40 mm | NA = 0.50 | κ = 790 nm |
|---|---|---|---|
| SURFACE | r | d | n |
| 1 | 2.1580 | 1.6000 | 1.53653 |
| 2 | −8.7400 | 1.7570 | — |
| 3 | ∞ | 1.2000 | 1.57307 |
| 4 | ∞ | — | — |

The first surface 11 is divided into the central area and the peripheral area by the boundary whose height with respect to the optical axis is hx. The central area is subsided with respect to the peripheral area. These areas are rotationally symmetrical aspherical, surfaces having different shapes, with the step S (i.e., the level difference) formed at the boundary thereof. The second surface 12 is a rotationally symmetrical aspherical surface having no steps.

An effective radius hmax, the boundary height hx, the paraxial radii r of the central and peripheral areas, the conical coefficient κ, the aspherical coefficients $A_4$, $A_6$, $A_8$, $A_{10}$ and $A_{12}$, a product ΔN and the OPD N are indicated in TABLE 9.

TABLE 9

| | hmax = 1.70 mm | hx = 1.51 mm | |
|---|---|---|---|
| | FIRST SURFACE | | SECOND |
| | CENTRAL AREA | PERIPHERAL AREA | SURFACE |
| r | 2.1580 | 2.1590 | −8.7400 |
| κ | −0.5200 | −0.5200 | 0.0000 |
| A4 | $-3.5920 \times 10^{-4}$ | $-3.5800 \times 10^{-4}$ | $7.7000 \times 10^{-3}$ |
| A6 | $1.9350 \times 10^{-4}$ | $1.9290 \times 10^{-4}$ | $6.7400 \times 10^{-4}$ |
| A8 | $-1.5890 \times 10^{-5}$ | $-1.5500 \times 10^{-5}$ | $-1.4530 \times 10^{-3}$ |
| A10 | $-4.4430 \times 10^{-5}$ | $-4.4420 \times 10^{-5}$ | $4.1900 \times 10^{-4}$ |
| A12 | $1.5720 \times 10^{-6}$ | $1.6000 \times 10^{-6}$ | $-4.2950 \times 10^{-5}$ |
| ΔN | — | −0.002945 | — |
| N | — | −2 | — |

Figure 16A:
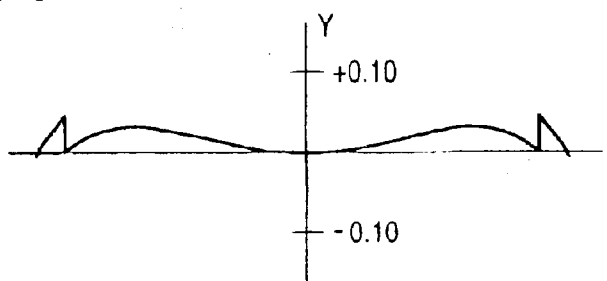
FIG. 16A is a graph showing axial wavefront aberration when the temperature of the objective lens according to the fifth example is increased from a reference temperature by +40° C.
Figure 16B:
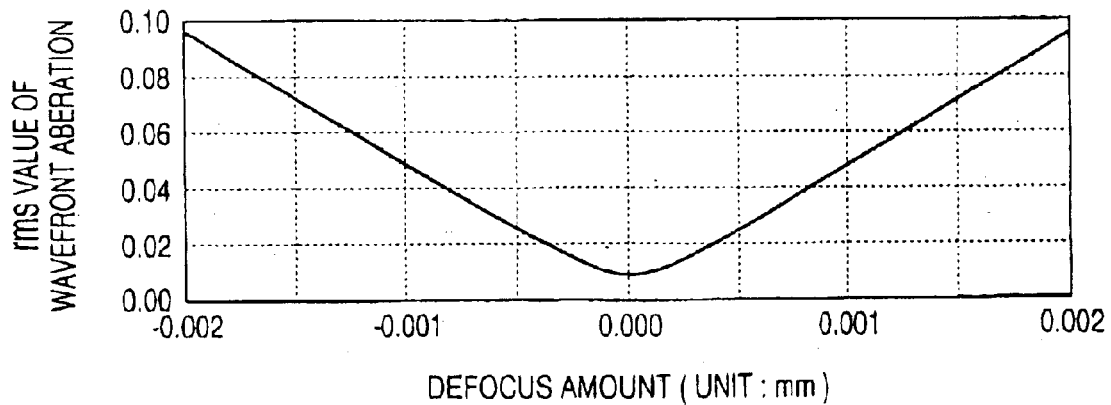
FIG. 16B is a graph showing a relationship between a defocus amount and an rms value of the wavefront aberration when temperature of the objective lens according to the fifth example is increased from a reference temperature by +40° C.
Figure 17A:
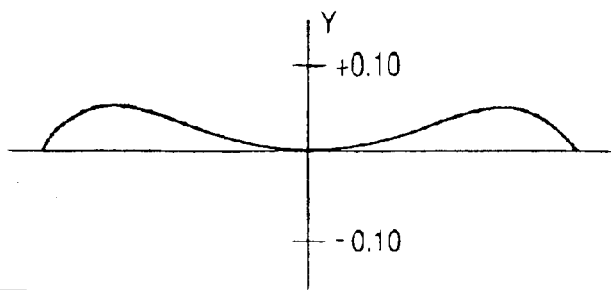
FIG. 17A is a graph showing axial wavefront aberration when the temperature of an objective lens according to a fourth comparative example is increased from a reference temperature by +40° C.
Figure 17B:
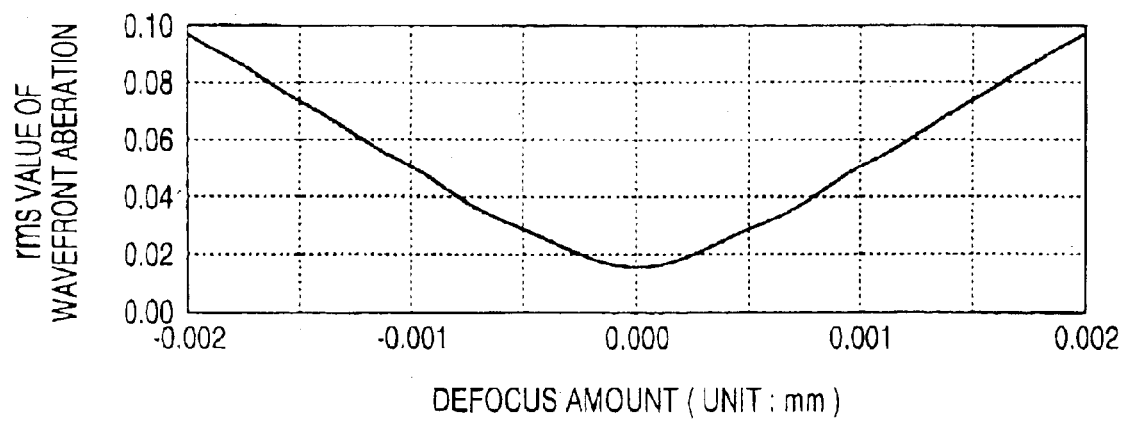
FIG. 17B is a graph showing a relationship between a defocus amount and an rms value of the wavefront aberration when temperature of the objective lens according to the fourth comparative example is increased from a reference temperature by +40° C.

Next, with reference to FIGS. 16A–16B and 17A–17B, the effects of the step S on the wavefront aberration will be described. FIGS. 16A–16B show aberrations when the temperature of the objective lens 10 according to the fifth example is increased by 40 degrees with respect to the reference temperature. In particular, FIG. 16A shows a paraxial wavefront aberration, and FIG. 16B shows a relationship between a defocus amounts and the rms value of the wavefront aberration. In each graph, the vertical axis represents an amount of the aberration (unit: wavelength), and the horizontal axis of FIG. 16B represents the defocus amount (unit: mm). FIGS. 17A and 17B show characteristics, which are similar to those shown in FIGS. 16A and 16B, of a fourth comparative example which is similar to the fifth example except that the step S is not formed.

The wavelength λ', the refractive index n' of the objective lens 10 and the refractive index n' of the cover layer D of the optical disc after the temperature is increased by 40 degrees are 798 nm, 1.53193 and 1.56837, respectively.

According to the fifth example, as shown in FIG. 16A, the characteristic of the wavefront aberration includes stepped portions, and the quantity of the aberration at the peripheral area is relatively small. Accordingly, as shown in FIG. 16B, the rms value of the wavefront aberration at the in-focus condition (i.e., defocus is zero) is suppressed to 0.010λ. On the contrary, according to the fourth comparative example, as shown FIG. 17A, the wavefront aberration at the peripheral area is large, and thus, the rms value of the wavefront aberration at the in-focus condition is 0.084λ (see FIG. 17B). It is known from the above that the rms value of the wavefront aberration can be reduced by approximately 38% by forming the step S.

SIXTH EXAMPLE

Figure 18:
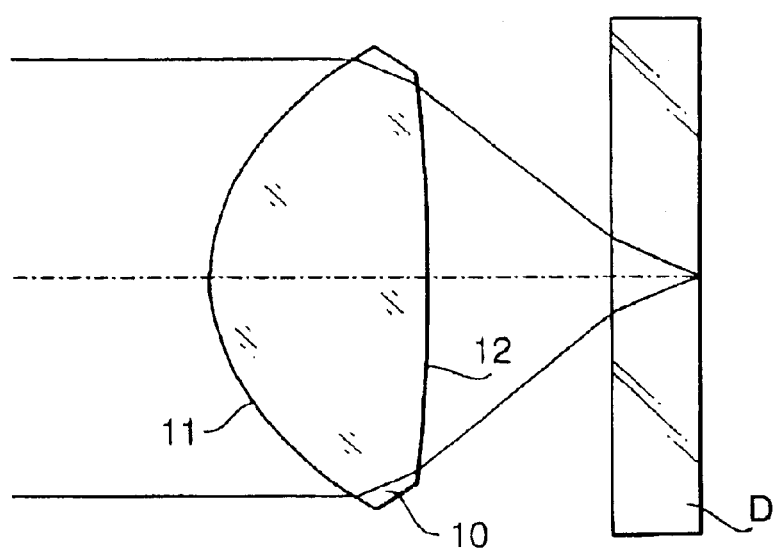
FIG. 18 is a lens diagram showing the objective lens according to the sixth example and an optical disc.

FIG. 18 is a lens diagram showing the objective lens 10 according to the sixth example and the cover layer D of the optical disc. The basic numerical structure of the third example is indicated in TABLE 10.

TABLE 10

| | f = 2.40 mm | NA = 0.65 | λ = 660 nm | |
|---|---|---|---|---|
| SURFACE | r | d | n | |
| 1 | 1.5120 | 1.4400 | 1.54044 | |
| 2 | −6.0760 | 1.2183 | — | |
| 3 | ∞ | 0.6000 | 1.57961 | |
| 4 | ∞ | — | — | |

The first surface 11 is divided into the central area and the peripheral area by the boundary whose height with respect to the optical axis is hx. The central area is subsided with respect to the peripheral area. These areas are rotationally symmetrical aspherical surfaces having different shapes, with the step S (i.e., the level difference) formed at the boundary thereof. The second surface 12 is a rotationally symmetrical aspherical surface having no steps.

An effective radius hmax, the boundary height hx, the paraxial radii r of the central and peripheral areas, the conical coefficient κ, the aspherical coefficients $A_4$, $A_6$, $A_8$, $A_{10}$ and $A_{12}$, a product ΔN and the OPD N are indicated in TABLE 11.

TABLE 11

| | hmax = 1.56 mm | hx = 1.42 mm | |
|---|---|---|---|
| | FIRST SURFACE | | SECOND |
| | CENTRAL AREA | PERIPHERAL AREA | SURFACE |
| r | 1.5120 | 1.5150 | −6.0760 |
| κ | −0.4700 | −0.4700 | 0.0000 |
| $A_4$ | −8.4460 × 10$^{-4}$ | −8.3480 × 10$^{-4}$ | 3.6370 × 10$^{-2}$ |
| $A_6$ | −3.0030 × 10$^{-4}$ | −2.9510 × 10$^{-4}$ | −1.4550 × 10$^{-2}$ |
| $A_8$ | −4.2830 × 10$^{-5}$ | −4.2960 × 10$^{-5}$ | 5.3690 × 10$^{-3}$ |
| $A_{10}$ | −1.0020 × 10$^{-4}$ | −9.7930 × 10$^{-5}$ | −1.1990 × 10$^{-3}$ |
| $A_{12}$ | 2.4673 × 10$^{-5}$ | 2.4085 × 10$^{-5}$ | 1.1816 × 10$^{-4}$ |
| ΔN | — | −0.008549 | — |
| N | — | −7 | — |

Figure 19A:
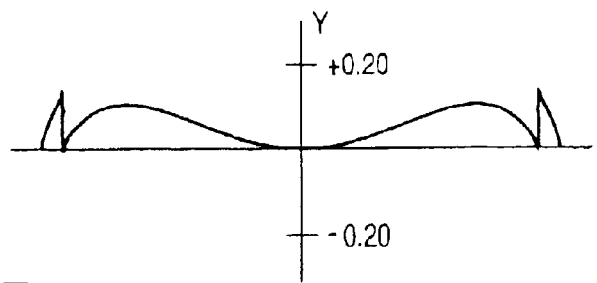
FIG. 19A is a graph showing axial wavefront aberration when the temperature of the objective lens according to the sixth example is increased from a reference temperature by +40° C.
Figure 19B:
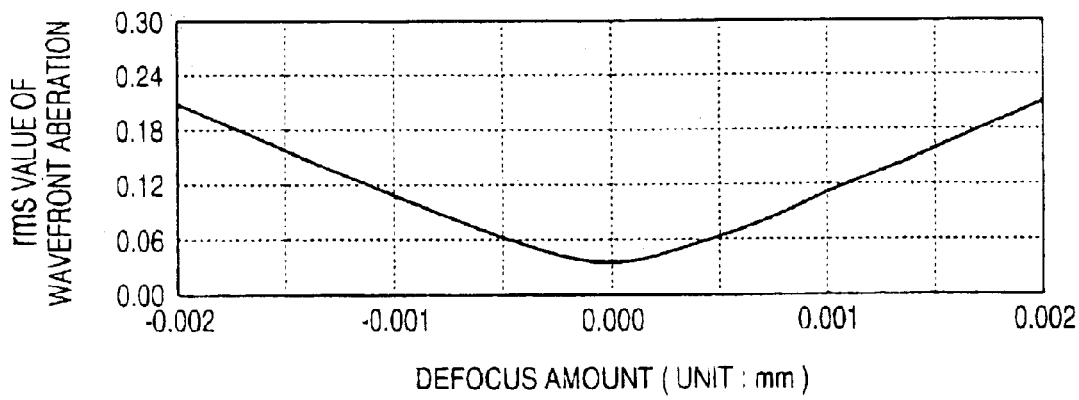
FIG. 19B is a graph showing a relationship between a defocus amount and an rms value of the wavefront aberration when temperature of the objective lens according to the sixth example is increased from a reference temperature by +40° C.
Figure 20A:
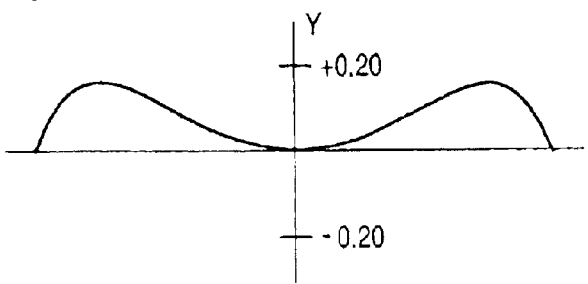
FIG. 20A is a graph showing axial wavefront aberration when the temperature of an objective lens according to a fifth comparative example is increased from a reference temperature by +40° C.
Figure 20B:
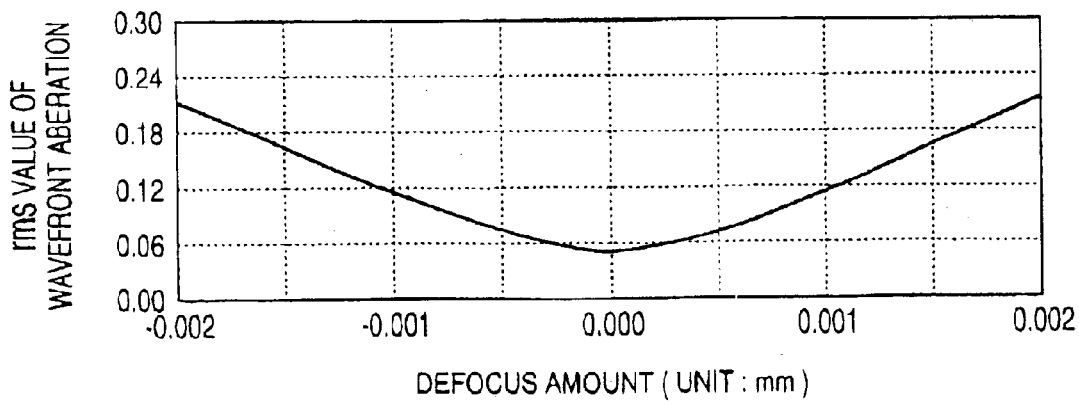
FIG. 20B is a graph showing a relationship between a defocus amount and an rms value of the wavefront aberration when temperature of the objective lens according to the fifth comparative example is increased from a reference temperature by +40° C.

Next, with reference to FIGS. 19A–19B and 20A–20B, the effects of the step S on the wavefront aberration will be described. FIGS. 19A–19B show aberrations when the temperature of the objective lens 10 according to the sixth example is increased by 40 degrees with respect to the reference temperature. In particular, FIG. 19A shows a paraxial wavefront aberration, and FIG. 19B shows a relationship between a defocus amounts and the rms value of the wavefront aberration. In each graph, the vertical axis represents an amount of the aberration (unit: wavelength), and the horizontal axis of FIGS. 19B represents the defocus amount (unit: mm). FIGS. 20A and 20B show characteristics, which are similar to those shown in FIGS. 19A and 19B, of a fifth comparative example which is similar to the sixth example except that the step S is not formed.

The wavelength λ', the refractive index n' of the objective lens 10 and the refractive index n' of the cover layer D of the optical disc after the temperature is increased by 40 degrees are 668 nm, 1.53575 and 1.57469, respectively.

According to the sixth example, as shown in FIG. 19A, the characteristic of the wavefront aberration includes stepped portions, and the quantity of the aberration at the peripheral area is relatively small. Accordingly, as shown in FIG. 19B, the rms value of the wavefront aberration at the in-focus condition (i.e., defocus is zero) is suppressed to 0.033λ. On the contrary, according to the fifth comparative example, as shown FIG. 20A, the wavefront aberration at the peripheral area is large, and thus, the rms value of the wavefront aberration at the in-focus condition is 0.051λ (see FIG. 20B). It is known from the above that the rms value of the wavefront aberration can be reduced by approximately 35% by forming the step S.

SEVENTH EXAMPLE

Figure 21:
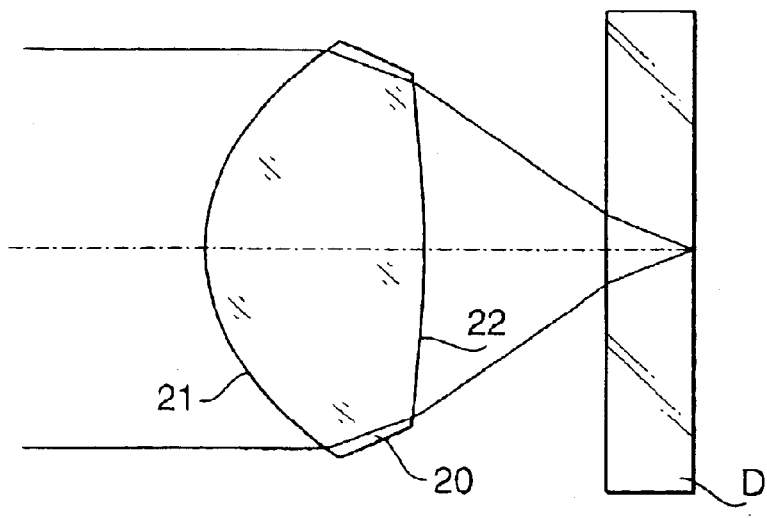
FIG. 21 is a lens diagram showing the objective lens according to the seventh example and an optical disc.

FIG. 21 is a lens diagram showing the objective lens 20 according to the seventh example and the cover layer D of the optical disc. The basic numerical structure of the third example is indicated in TABLE 12.

TABLE 12

| | f = 2.40 mm | NA = 0.60 | λ = 660 nm | |
|---|---|---|---|---|
| SURFACE | r | d | n | |
| 1 | 1.5120 | 1.4400 | 1.54044 | |
| 2 | −6.0760 | 1.2183 | — | |
| 3 | ∞ | 0.6000 | 1.57961 | |
| 4 | ∞ | — | — | |

The first surface 21 is divided into the central area and the peripheral area by the boundary whose height with respect to the optical axis is hx. The central area is protruded with respect to the peripheral area. These areas are rotationally symmetrical aspherical surfaces having different shapes, with the step S (i.e., the level difference) formed at the boundary thereof. The second surface 22 is a rotationally symmetrical aspherical surface having no steps.

An effective radius hmax, the boundary height hx, the paraxial radii r of the central and peripheral areas, the conical coefficient κ, the aspherical coefficients $A_4$, $A_6$, $A_8$, $A_{10}$ and $A_{12}$, a product ΔN and the OPD N are indicated in TABLE 13.

TABLE 13

| | hmax = 1.44 mm | hx = 0.69 mm | |
|---|---|---|---|
| | FIRSUT SURFACE | | SECOND |
| | CENTRAL AREA | PERIPHERAL AREA | SURFACE |
| r | 1.5120 | 1.5150 | −6.0760 |
| κ | −0.4700 | −0.4700 | 0.0000 |
| $A_4$ | −8.7040 × 10$^{-4}$ | −8.7640 × 10$^{-4}$ | 3.6270 × 10$^{-2}$ |
| $A_6$ | −2.4500 × 10$^{-4}$ | −2.4700 × 10$^{-4}$ | −1.4130 × 10$^{-2}$ |
| $A_8$ | −7.9390 × 10$^{-5}$ | −7.9700 × 10$^{-5}$ | 5.1330 × 10$^{-3}$ |
| $A_{10}$ | −5.8270 × 10$^{-5}$ | −5.9320 × 10$^{-5}$ | −1.1860 × 10$^{-3}$ |
| $A_{12}$ | 1.1604 × 10$^{-5}$ | 1.1840 × 10$^{-5}$ | 1.2636 × 10$^{-4}$ |
| ΔN | — | −0.004885 | — |
| N | — | −4 | — |

Figure 22A:
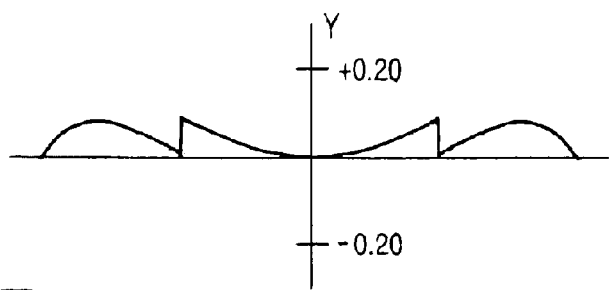
FIG. 22A is a graph showing axial wavefront aberration when the temperature of the objective lens according to the seventh example is increased from a reference temperature by +40° C.
Figure 22B:
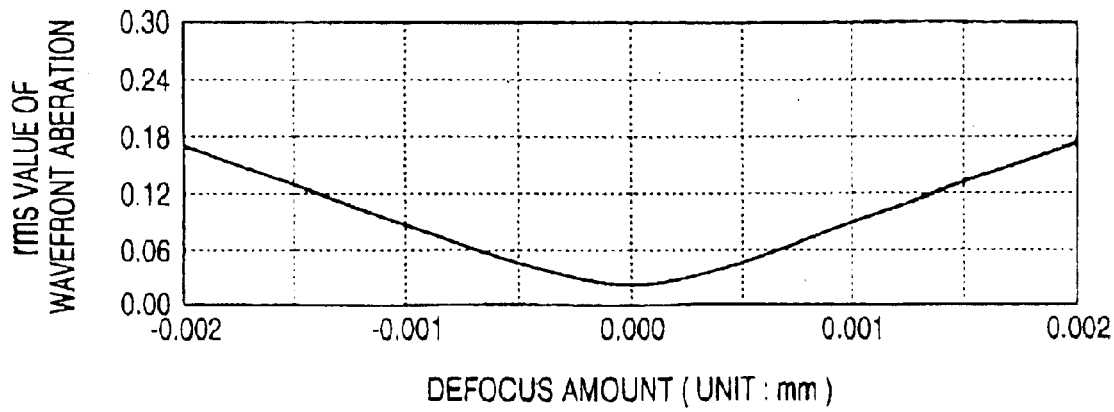
FIG. 22B is a graph showing a relationship between a defocus amount and an rms value of the wavefront aberration when temperature of the objective lens according to the seventh example is increased from a reference temperature by +40° C.

Next, with reference to FIGS. 22A–22B and 23A–23B, the effects of the step S on the wavefront aberration will be described. FIGS. 22A–22B show aberrations when the temperature of the objective lens 20 according to the seventh example is increased by 40 degrees with respect to the reference temperature. In particular, FIG. 20A shows a paraxial wavefront aberration, and FIG. 20B shows a relationship between a defocus amounts and the rms value of the wavefront aberration. In each graph, the vertical axis represents an amount of the aberration (unit: wavelength), and the horizontal axis of FIGS. 22B represents the defocus amount (unit: mm). FIGS. 23A and 23B show characteristics, which are similar to those shown in FIG. 22A and 22B, of a sixth comparative example which is similar to the seventh example except that the step S is not formed.

The wavelength λ', the refractive index n' of the objective lens 20 and the refractive index n' of the cover layer D of the optical disc after the temperature is increased by 40 degrees are 668 nm, 1.53575 and 1.57469, respectively.

According to the seventh example, as shown in FIG. 22A, the characteristic of the wavefront aberration includes stepped portions, and the quantity of the aberration at the peripheral area is relatively small. Accordingly, as shown in FIG. 22B, the rms value of the wavefront aberration at the in-focus condition (i.e., defocus is zero) is suppressed to $0.023\lambda$. On the contrary, according to the sixth comparative example, as shown FIG. 23A, the wavefront aberration at the peripheral area is large, and thus, the rms value of the wavefront aberration at the in-focus condition is $0.034\lambda$ (see FIG. 23B). It is known from the above that the rms value of the wavefront aberration can be reduced by approximately 32% by forming the step S.

Conditions (1)–(10), and values for each of the examples are indicated in TABLE 14. Each of the first, second, fourth, fifth and sixth examples satisfies conditions (1)–(4), and further, fifth and sixth examples satisfy condition (5). Each of the third and seventh examples satisfies conditions (6)–(9), and the seventh example satisfies condition (10).

TABLE 14

| CONDITION | 1st EX. | 2nd EX. | 3rd EX. | 4th EX. | 5th EX. | 6th EX. | 7th EX. |
|---|---|---|---|---|---|---|---|
| (1), (2) | 0.91 | 0.89 | — | 0.89 | 0.89 | 0.91 | — |
| (3) | −9.9 | −5.28 | — | −6.48 | −1.58 | −4.62 | — |
| (4), (5) | 1.15 | 0.85 | — | 0.72 | 0.47 | 0.54 | — |
| (6), (7) | — | — | 0.46 | — | — | — | 0.48 |
| (8) | — | — | 5.28 | — | — | — | 2.64 |
| (9), (10) | — | — | −0.61 | — | — | — | −0.42 |

As described above, only by forming a single step on one surface of the objective lens, deterioration of the wavefront aberration due to the change of temperature can be reduced by 38% at the largest. With use of such an objective lens, a beam spot as desired can be formed on an optical disc.

Since only one step is required, it is easy to process. That is, if the lens is formed in accordance with the injection molding process, the metal molding can be formed easily. For forming the metal molding, a particular cutting tool having a minute tip is not necessary. A normal cutting tool and/or a rounded corner cutting tool (an R cutting tool) can be used. Accordingly, the manufacturing cost can be suppressed.

The present disclosure relates to the subject matter contained in Japanese Patent Application No. 2002-168569, filed on Jun. 10, 2002, which is expressly incorporated herein by reference in its entirety.

What is claimed is:

1. An objective lens for an optical pickup having a single lens element having two refraction surfaces, one of said two refraction surfaces being divided into a central area including an optical axis of said objective lens and a peripheral area outside said central area, a step providing a level difference along a direction of the optical axis being formed at a boundary between said central area and said peripheral area, said step providing a phase shift between light passing through said central area and light passing through said peripheral area, said phase shift suppressing deterioration of wavefront aberration due to a change of temperature, said level difference being formed such that a thickness on the peripheral area side is greater than a thickness on the central area side at the boundary, said objective lens being configured to satisfy a condition:

$$0.83 < hx/hmax < 0.97,$$

wherein,
hx is a radius of the boundary, and
hmax is an effective radius defining a numerical aperture of said surface formed with the step.

2. The objective lens according to claim 1, which is configured to satisfy a condition:

$$0.88 < hx/hmax < 0.93.$$

3. The objective lens according to claim 1, wherein said step is formed to satisfy condition:

$$-14 < N \times \lambda < 0 \ [\mu m],$$

wherein,
N is an optical path difference (unit: $\lambda$) of a ray passing through the peripheral area with respect to a ray passing through the central area, and
$\lambda$ is a design wavelength (unit: $\mu$m).

4. The objective lens according to claim 1, wherein said step is configured to satisfy a condition:

$$0.07 < \frac{N \times \lambda}{NA^4} \times \left(\frac{\lambda(n'-1)}{\lambda'(n-1)} - 1\right) < 1.20 \ [\mu m],$$

wherein,
N represents an optical path difference (unit: $\lambda$) of a ray passing the peripheral area with respect to a ray passing the central area,
NA represents a numerical aperture of the objective lens,
$\lambda$ represents a design wavelength [$\mu$m],
$\lambda'$ represents a wavelength at a changed temperature [$\mu$m],
n represents a refractive index of material of said objective lens at the design wavelength, and
n' represents a refractive index of the material of said objective lens at a wavelength at the changed temperature.

5. The objective lens according to claim 4, wherein said step is formed to satisfy a condition:

$$0.22 < \frac{N \times \lambda}{NA^4} \times \left(\frac{\lambda(n'-1)}{\lambda'(n-1)} - 1\right) < 0.62 \ [\mu m].$$

6. The objective lens according to claim 3, wherein N is an integer.

7. The objective lens according to claim 4, wherein N is an integer.

8. The objective lens according to claim 5, wherein N is an integer.

9. The objective lens according to claim 1, wherein said objective lens is formed using a molding which is processed using rounded corner cutting tool.

10. An objective lens for an optical pickup having a single lens element having two refraction surfaces, one of said two refraction surfaces being divided into a central area including an optical axis of said objective lens and a peripheral area outside said central area, a step providing a level difference along a direction of the optical axis being formed at a boundary between said central area and said peripheral area, said step providing a phase shift between light passing through said central area and light passing through said peripheral area, said phase shift suppressing deterioration of wavefront aberration due to a change of temperature, said level difference being formed such that a thickness on the central area side is greater than a thickness on the peripheral area side at the boundary, said objective lens being configured to satisfy a condition:

$$0.34 < hx/hmax < 0.60,$$

wherein, hx is a radius of the boundary, and hmax is an effective radius defining a numerical aperture of said surface formed with the step.

11. The objective lens according to claim 10, which is configured to satisfy a condition:

$$0.41 < hx/hmax < 0.55.$$

12. The objective lens according to claim 10, wherein said step is formed to satisfy condition:

$$0 < N \times \lambda < 12 \ [\mu m],$$

wherein N is an optical path difference (unit: λ) of a ray passing through the peripheral area with respect to a ray passing through the central area, and wherein λ is a design wavelength (unit: μm).

13. The objective lens according to claim 10, wherein said step is configured to satisfy a condition:

$$-1.20 < \frac{N \times \lambda}{NA^4} \times \left( \frac{\lambda(n'-1)}{\lambda'(n-1)} - 1 \right) < -0.07 \ [\mu m],$$

wherein,
N represents an optical path difference (unit: λ) of a ray passing the peripheral area with respect to a ray passing the central area, NA represents a numerical aperture of the objective lens, λ represents a design wavelength [μm], λ' represents a wavelength at a changed temperature [μm], n represents a refractive index of material of said objective lens at the design wavelength, and n' represents a refractive index of the material of said objective lens at a wavelength at the changed temperature.

14. The objective lens according to claim 13, wherein said step is formed to satisfy a condition:

$$-0.50 < \frac{N \times \lambda}{NA^4} \times \left( \frac{\lambda(n'-1)}{\lambda'(n-1)} - 1 \right) < -0.22 \ [\mu m].$$

15. The objective lens according to claim 12, wherein N is an integer.

16. The objective lens according to claim 13, wherein N is an integer.

17. The objective lens according to claim 14, wherein N is an integer.

18. The objective lens according to claim 10, wherein said objective lens is formed using a molding which is processed using a rounded corner cutting tool.

* * * * *